(12) United States Patent
Bye

(10) Patent No.: US 7,664,036 B2
(45) Date of Patent: Feb. 16, 2010

(54) DYNAMIC REAL-TIME QUALITY MANAGEMENT OF PACKETIZED COMMUNICATIONS IN A NETWORK ENVIRONMENT

(75) Inventor: Richard Bye, Rancho Santa Margarita, CA (US)

(73) Assignee: Broadcom Corporation, Irvine, CA (US)

( * ) Notice: Subject to any disclaimer, the term of this patent is extended or adjusted under 35 U.S.C. 154(b) by 1027 days.

(21) Appl. No.: 10/779,838

(22) Filed: Feb. 17, 2004

(65) Prior Publication Data

US 2005/0002379 A1 Jan. 6, 2005

Related U.S. Application Data

(60) Provisional application No. 60/472,647, filed on May 22, 2003.

(51) Int. Cl.
*G01R 31/08* (2006.01)

(52) U.S. Cl. .................. 370/237; 370/229; 370/230; 370/232; 370/235; 370/271; 370/352; 370/353; 370/354; 370/355; 370/356; 455/424; 455/425; 455/426.2; 455/436; 455/440; 455/442; 455/443; 455/444; 455/554.2

(58) Field of Classification Search ......... 370/229–235, 370/237, 351–356, 271; 455/424–425, 426.2, 455/436–440, 442–444, 554.2
See application file for complete search history.

(56) References Cited

U.S. PATENT DOCUMENTS

| | | | |
|---|---|---|---|
| 6,236,642 B1* | 5/2001 | Shaffer et al. | 370/237 |
| 6,282,192 B1* | 8/2001 | Murphy et al. | 370/352 |
| 6,307,853 B1* | 10/2001 | Storch et al. | 370/354 |
| 6,339,594 B1* | 1/2002 | Civanlar et al. | 370/352 |
| 6,356,545 B1* | 3/2002 | Vargo et al. | 370/355 |
| 6,359,899 B1* | 3/2002 | Krishnakumar et al. | 370/444 |
| 6,363,065 B1* | 3/2002 | Thornton et al. | 370/352 |
| 6,452,915 B1* | 9/2002 | Jorgensen | 370/338 |
| 6,505,255 B1* | 1/2003 | Akatsu et al. | 709/239 |
| 6,510,219 B1* | 1/2003 | Wellard et al. | 379/221.01 |
| 6,515,964 B1* | 2/2003 | Cheung et al. | 370/230 |
| 6,570,849 B1* | 5/2003 | Skemer et al. | 370/230.1 |
| 6,765,931 B1* | 7/2004 | Rabenko et al. | 370/493 |
| 6,781,983 B1* | 8/2004 | Armistead | 370/353 |
| 7,023,839 B1* | 4/2006 | Shaffer et al. | 370/356 |
| 7,068,601 B2* | 6/2006 | Abdelilah et al. | 370/231 |
| 7,088,677 B1* | 8/2006 | Burst, Jr. | 370/229 |

(Continued)

*Primary Examiner*—Hemant Patel
(74) *Attorney, Agent, or Firm*—Garlick Harrison & Markison; Robert A. McLauchian, III; Shayne X. Short

(57) ABSTRACT

The present invention provides a dynamic real-time quality management of packetized communications in a network environment. Packetized communications are monitored by and exchanged between wireless Access Points (APs) and wireless terminals or by quality monitoring modules located within network segments or at network vertices. The processing unit analyzes the packetized communications to identify communication signatures associated with the packetized communications. The processor then uses these signatures to identify network impediments to the exchange of the packetized communications. These impediments may take the form of coding problems in which case an appropriate coding scheme is employed by the programmable COder/DECoder (CODEC) to convert incoming packetized communications to incoming user communications, and outgoing user communications to outgoing packetized communications. These impediments may also take the form of communication problems along and between the various network segments. In these cases, the processor may choose a more appropriate communication pathway with which to route the packetized communications.

23 Claims, 23 Drawing Sheets

U.S. PATENT DOCUMENTS

| | | | |
|---|---|---|---|
| 7,127,056 B2* | 10/2006 | Hu et al. | 379/221.03 |
| 7,167,451 B1* | 1/2007 | Oran | 370/252 |
| 7,203,163 B1* | 4/2007 | Hundscheidt et al. | 370/230 |
| 7,209,473 B1* | 4/2007 | Mohaban et al. | 370/352 |
| 7,307,980 B1* | 12/2007 | Shah | 370/352 |
| 7,466,719 B2* | 12/2008 | Xu et al. | 370/465 |
| 2001/0036190 A1* | 11/2001 | Takahashi | 370/401 |
| 2002/0078151 A1* | 6/2002 | Wickam et al. | 709/204 |
| 2002/0087711 A1* | 7/2002 | Leung | 709/233 |
| 2002/0105909 A1* | 8/2002 | Flanagan et al. | 370/230 |
| 2002/0146001 A1* | 10/2002 | Fushimi et al. | 370/352 |
| 2003/0067941 A1* | 4/2003 | Fall | 370/468 |
| 2003/0091024 A1* | 5/2003 | Stumer | 370/352 |
| 2003/0235177 A1* | 12/2003 | Park | 370/338 |
| 2004/0042402 A1* | 3/2004 | Galand et al. | 370/237 |
| 2004/0073701 A1* | 4/2004 | Huang et al. | 709/240 |
| 2004/0196786 A1* | 10/2004 | Laha et al. | 370/229 |
| 2004/0258239 A1* | 12/2004 | Gallant et al. | 379/900 |

* cited by examiner

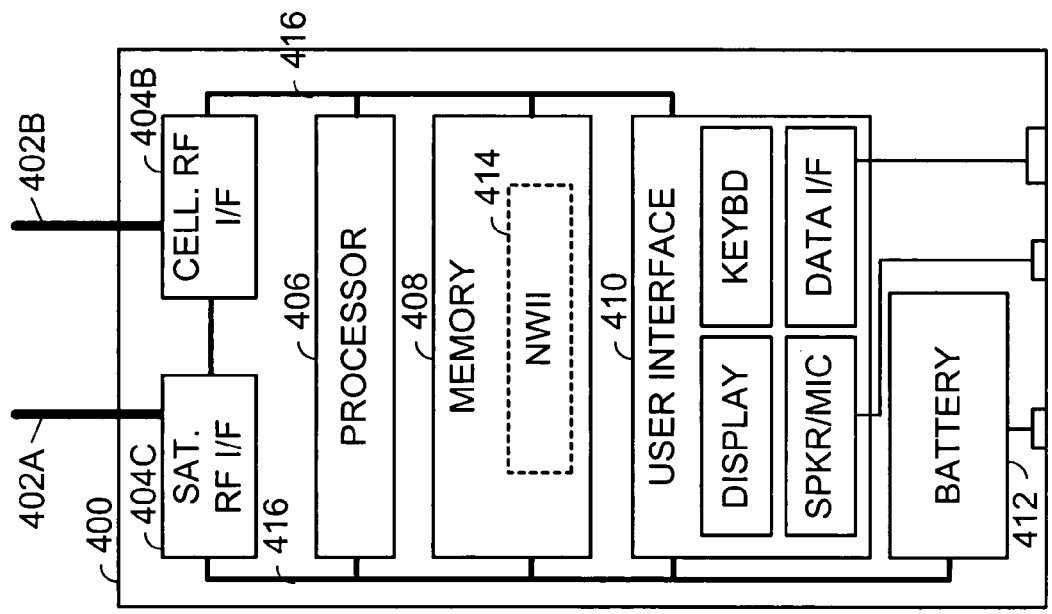

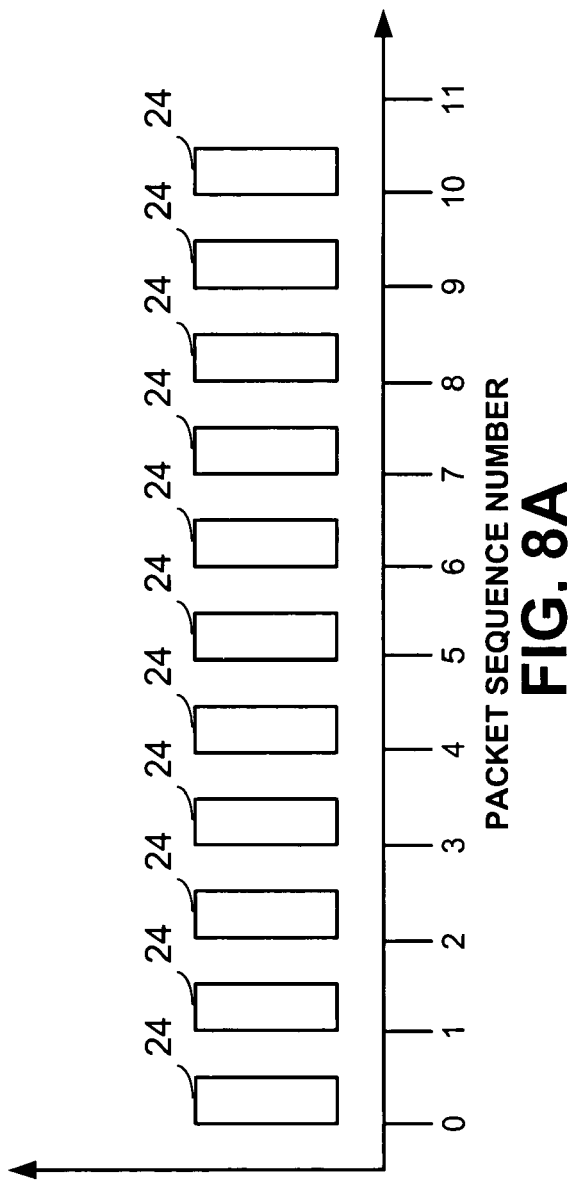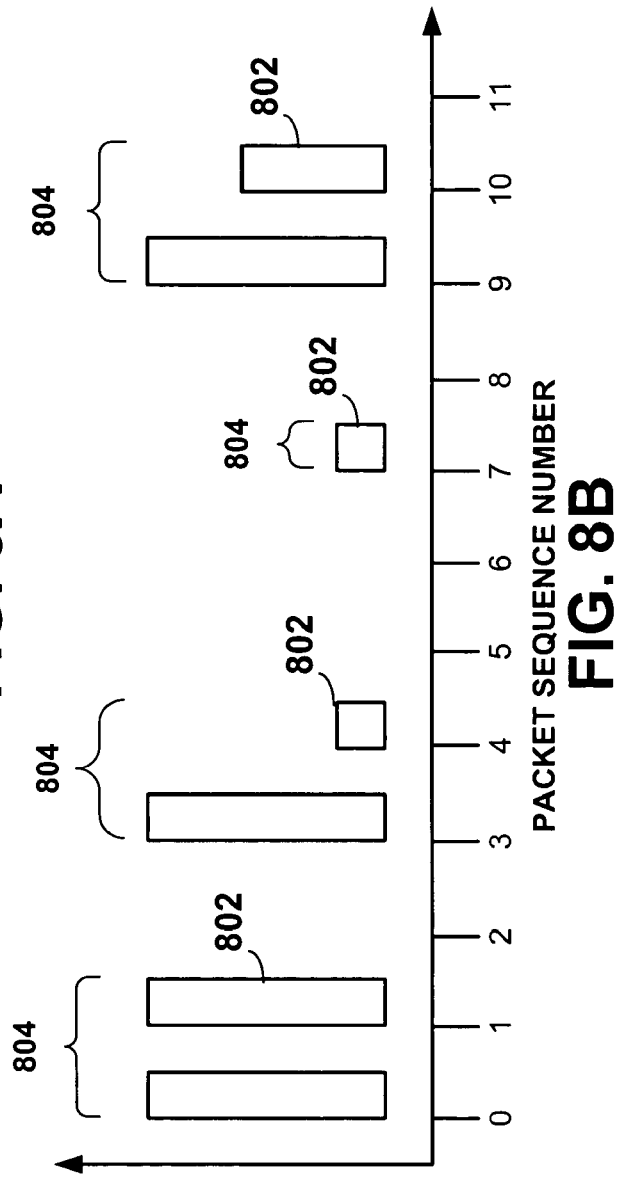

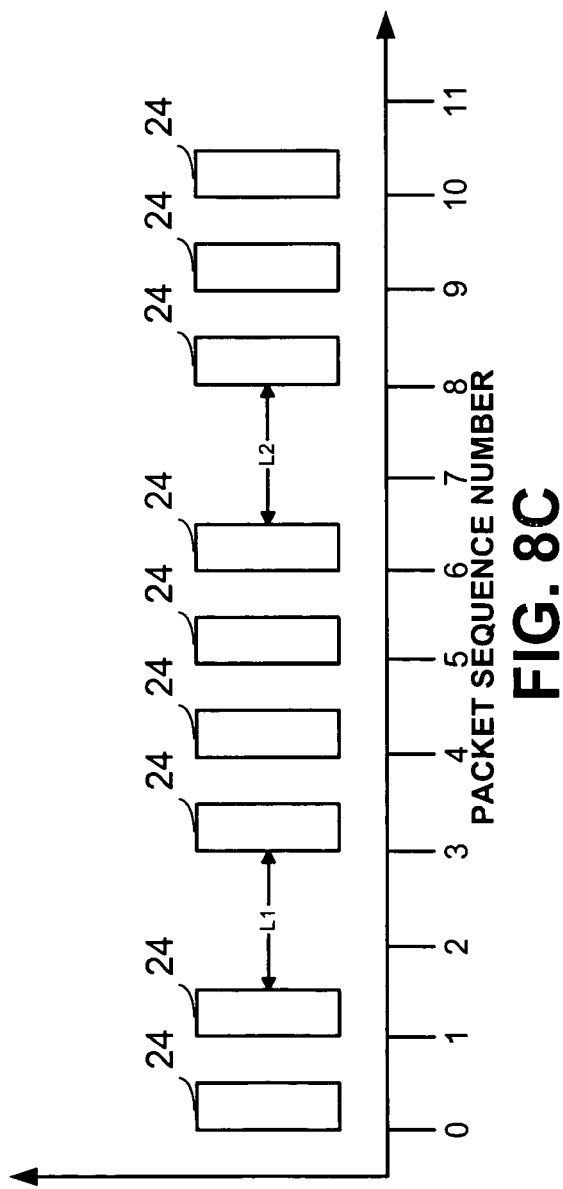
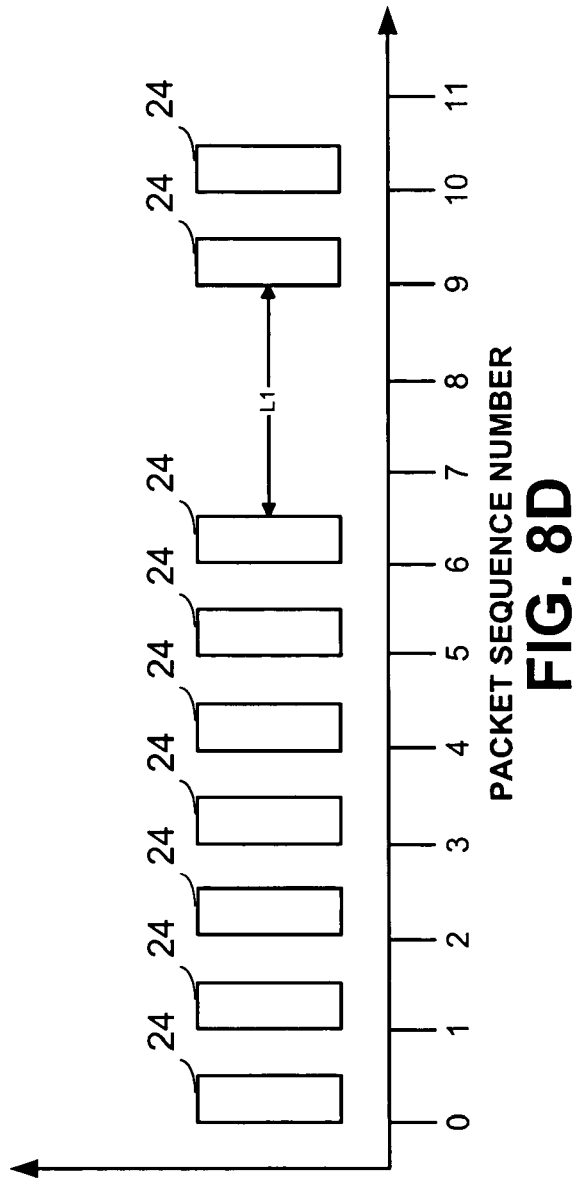

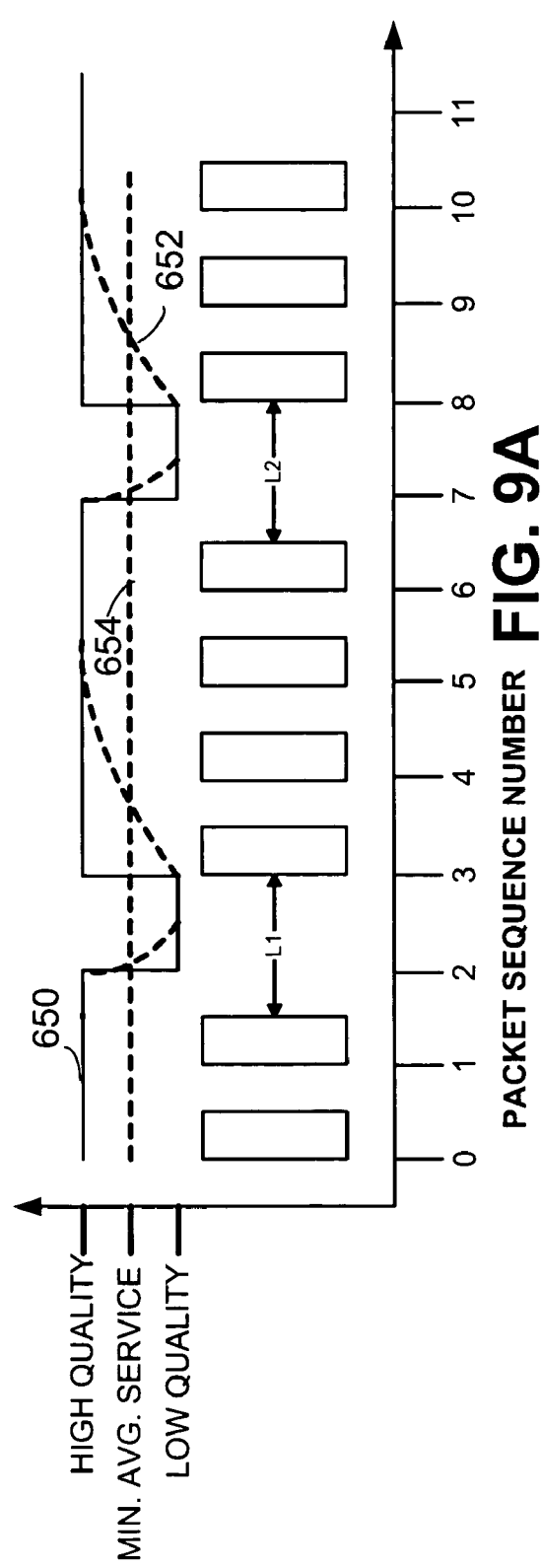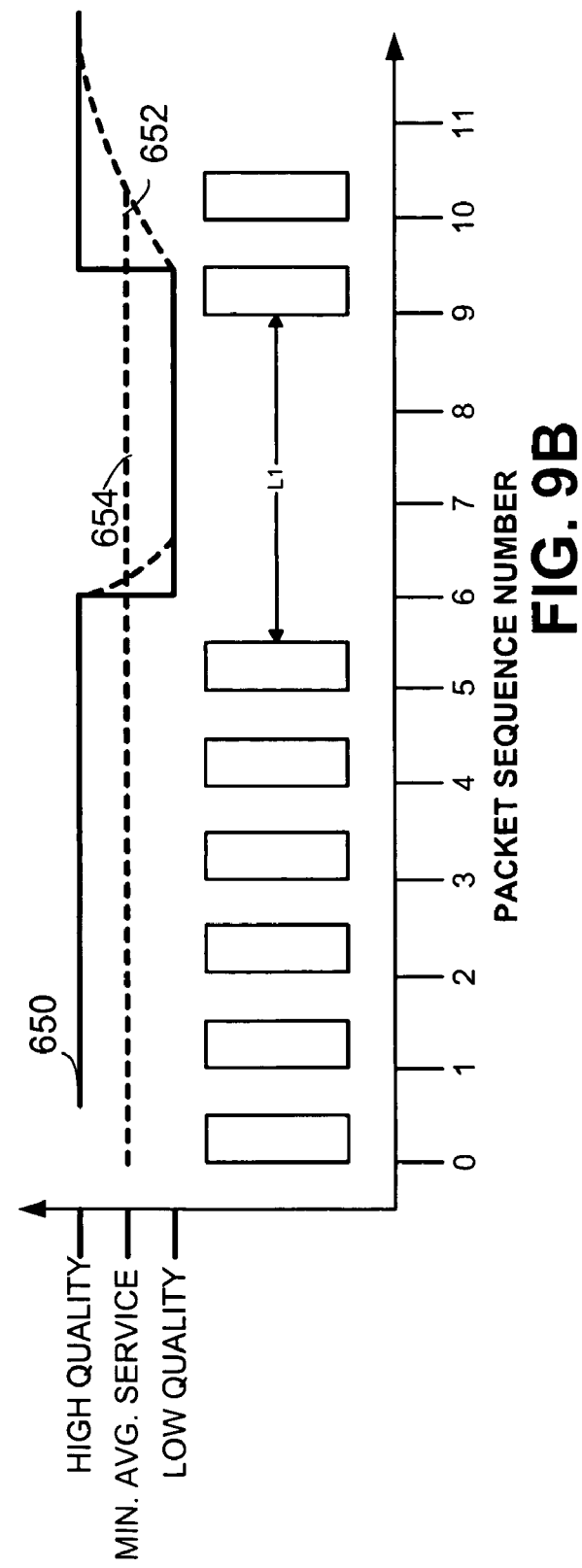

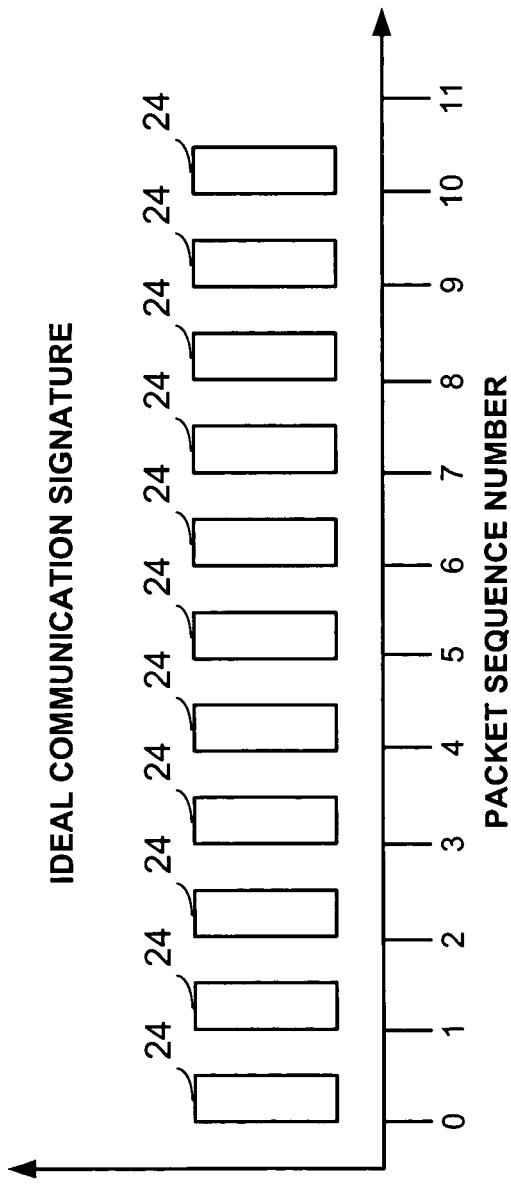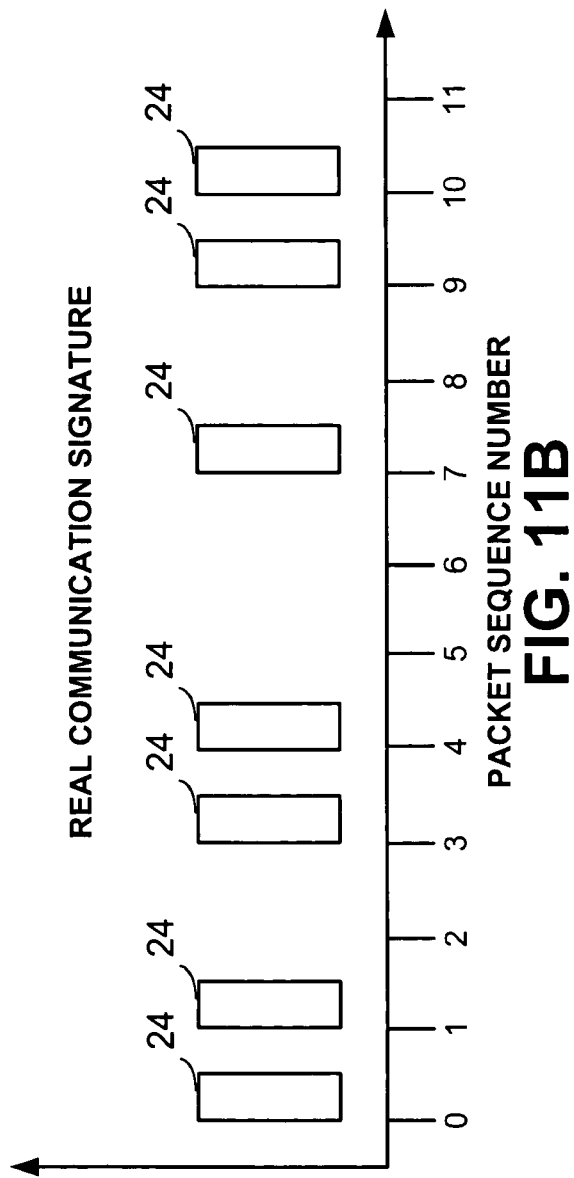

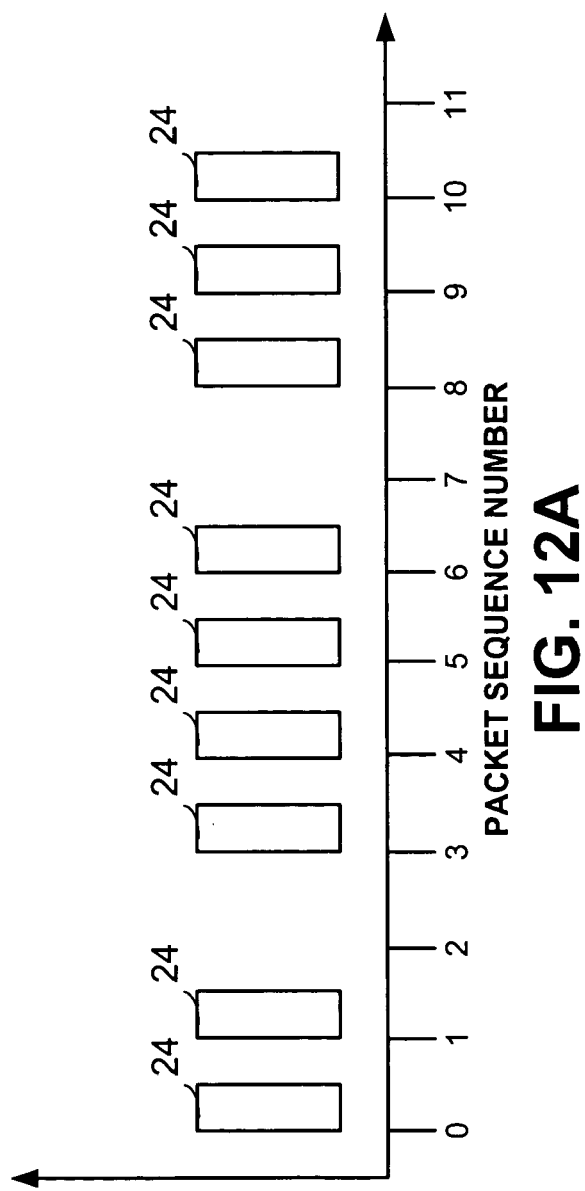
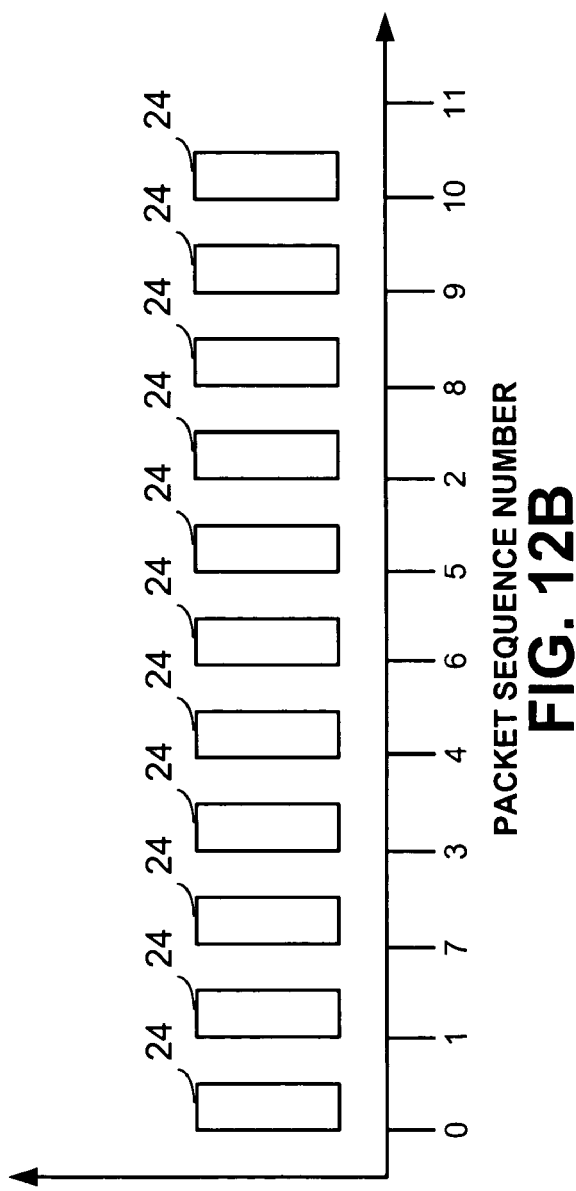

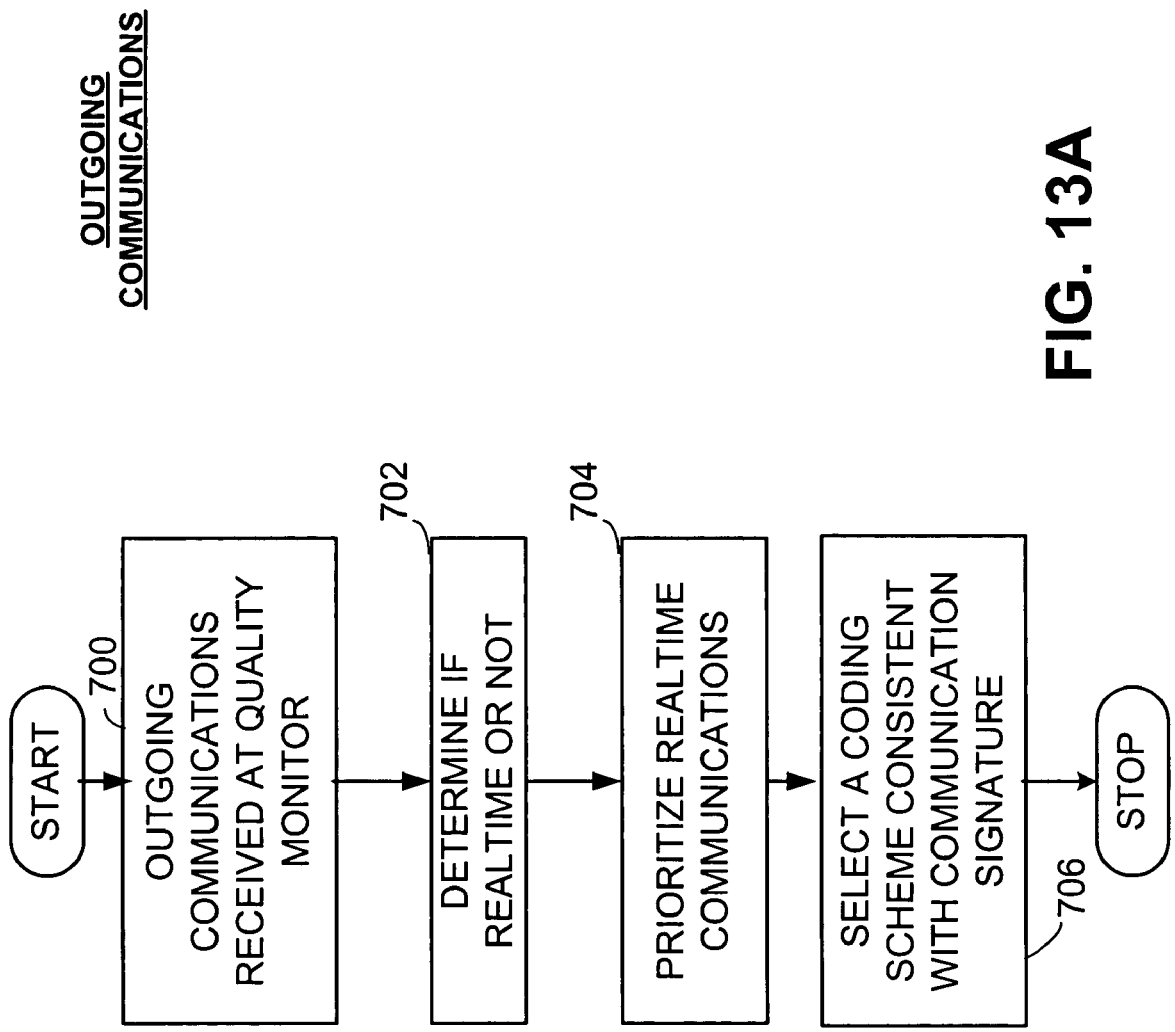

DYNAMIC REAL-TIME QUALITY MANAGEMENT OF PACKETIZED COMMUNICATIONS IN A NETWORK ENVIRONMENT

PROVISIONAL PRIORITY CLAIMS

The present U.S. Utility Patent Application claims priority pursuant to 35 U.S.C. §119(e) to the following U.S. Provisional Patent Application which is hereby incorporated herein by reference in its entirety and made part of the present U.S. Utility Patent Application for all purposes:

1. U.S. Provisional Application Ser. No. 60/472,647, entitled "Method for and off of a Telephone Call between Two Different Wireless Networks,", filed May 22, 2003, pending.

TECHNICAL FIELD OF THE INVENTION

The present invention relates generally to communication networks supporting multimedia packetized communications, and more particularly to a system for managing the quality of service provided by a wireless local area network.

BACKGROUND OF THE INVENTION

Communication technologies that network electronic devices are well known. Examples include wired packet data networks, wireless packet data networks, wired telephone networks, and satellite communication networks, among other networks. These communication networks typically include a network infrastructure that services a plurality of client devices. The Public Switched Telephone Network (PSTN) is probably the best-known communication network and has been in existence for many years. The Internet, another well-known example of a communication network, has also been in existence for a number of years. Communication networks like these enable client devices to communicate with one another on a global basis.

Local Area Networks (wired LANs), e.g., Ethernets, support communications between networked computers and other devices within a serviced area. These wired LANs often link serviced devices to Wide Area Networks (e.g., WANs) and the Internet. Each of these networks is generally considered a "wired" network, even though some of these networks, e.g., the PSTN, may include some transmission paths that are serviced by wireless links.

Wireless networks have come into existence more recently. Examples include cellular telephone networks, wireless LANs (WLANs), and satellite communication networks. Common forms of WLANs such as IEEE 802.11(a) networks, IEEE 802.11(b) networks, and IEEE 802.11(g) networks are referred to jointly as "IEEE 802.11 networks." In a typical IEEE 802.11 network, a wired backbone couples to a plurality of wireless Access Points (APs), each of which supports wireless communications with computers and other wireless terminals that include compatible wireless interfaces within a serviced area. The wired backbone couples the APs of the IEEE 802.11 network to other networks, both wired and wireless, and allows serviced wireless terminals to communicate with devices external to the IEEE 802.11 network. Devices that operate consistently with an IEEE 802.11 protocol may also support ad hoc networking in which wireless terminals communicate directly to one another without the presence of an AP.

Currently, Wireless Local Area Networks (WLANs) service a wide variety of data communications, typically relating to non-real-time requirements. As the bandwidth delivered on the wireless links serviced by the WLANs increases, additional data communications may also be delivered, e.g., Voice Over Internet Protocol (VOIP), video conferencing, multimedia streaming, etc. However, when the WLAN supports many data transactions, the communications requiring continual throughput such as voice and multimedia communications may not be sufficiently serviced. The result of this shortcoming is reduced voice and video image quality, disconnection of the serviced communication, etc.

The shortcomings of the WLAN may be at the APs that service the wireless links within the WLAN. Each WLAN supports only a maximum throughput, e.g., 11 Mbps (megabits per second) for IEEE 802.11b APs and 54 Mbps for 802.11a and 802.11g APs. When a particular AP cannot service all of its client devices, latency in the communications will increase. Because the AP cannot typically assign priority to its serviced communications, some or all of the serviced communications are adversely affected.

The performance of the WLAN may also be affected by the switches, routers, nodes or other elements in the backbone network of the WLAN and/or gateways that couple the WLAN to a WAN, to the Internet, to the Public Switched Telephone Network (PSTN) or to another servicing network. When these devices become overloaded, the WLAN serviced communications are also affected. Additionally, traffic within individual network segments may adversely impact communications.

WLANs often serve as terminating networks for voice communications, multimedia communications, etc. In some operations, the WLANs perform adequately but a network that couples the WLANs does not. An example of such an installation is when two offices of a major corporation each have WLAN service and a WAN couples the WLANs. In order to reduce telephony costs, voice traffic is routed across the WAN. When voice quality suffers, the WLAN administrators most likely identify the WLAN components as the problem even though the WAN itself may be the bottleneck. This troubleshooting most often occurs when reported by a user after the fact. By that time, the WAN problem may have been remedied and the system administrator can offer no solution. Such is also the case when the APs or other WLAN components are temporarily overloaded.

Thus, a need exists for intelligent systems and components that can identify network or pathway problems in real-time and effect real-time solutions.

SUMMARY OF THE INVENTION

This disclosure provides a system and method to service real-time audio and/or visual communications in a network environment that are negatively impacted by packet delay or packet losses, such as Voice over Internet Protocol (VoIP) or wireless terminals that transmit and receive communications in a digital form having discrete packets. More specifically, the present invention provides a dynamic real-time quality management of packetized communications in a network environment. Various solutions presented herein may involve dynamically altering coding schemes, network pathways or dynamically assigning priorities to network communications.

Packetized communications are monitored by and exchanged between wireless Access Points (APs) and wireless terminals or a wired terminal, such as a VoIP telephone, and a servicing network. Alternatively, the packetized communications are relayed by quality monitoring modules located within network segments or at network vertices. The processing unit analyzes the packetized communications to identify communication signatures associated with the packetized communications. The processor then uses these signatures to identify network impediments to the exchange of the packetized communications. These impediments may take the form of coding problems in which case an appropriate coding scheme is selected and implemented. Alternatively, the communication signatures may indicate network (traffic) or hardware problems within specific segments of the communication pathway. In this case, traffic is prioritized or rerouted.

One embodiment provides an intelligent Wireless Local Area Network (WLAN) Access Point (AP). A second embodiment provides an intelligent VoIP network interface. While, a third embodiment provides an intelligent quality-monitoring module. In the instance of a WLAN AP or intelligent VoIP network interface, the WLAN AP or intelligent VoIP network interface performs the functions of the quality-monitoring module. A wireless interface exchanges packetized communications with wireless terminals on the WLAN. A processing unit couples to the wireless interface and to the WLAN's backbone network interface, and monitors the exchange of communications serviced by the WLAN AP. The processing unit identifies the communication signature for the packetized communications. Then the processing unit determines, based upon the corresponding communication signature, when the packetized communications are real-time communications. Communications identified as real-time communications are assigned a predetermined service level. The service level assigned to non-real-time communications may be lower than that of the real-time communications.

When the real-time communications cannot be provided the predetermined service level, the processor may direct the real-time communications to be re-routed via another servicing network. Alternatively, the processor may direct that the real-time communications be prioritized over the non-real-time communications.

Each packetized communication has a pair of signatures: a receive signature corresponding to communications received from a corresponding wireless terminal via the wireless interface and a transmit signature corresponding to communications received via the WLAN backbone interface and intended for the corresponding wireless terminal. The receive signature is primarily employed to determine whether the packetized communication is a real-time communication. Problems in this signature typically indicate problems with wireless link of AP.

The transmit signature usually indicates problems (network impediments) within other portions of the communication path. Such network impediments may result in non-uniformity of receipt of the packetized communications from a near-end wireless terminal. This instance indicates problems in the wireless link. Non-uniformity or non-linearity of receipt of the packetized communications from a far-end terminal indicates problems along the various network pathways between the AP and the far-end terminal.

Another embodiment takes the form of a method of servicing real-time communications in a network environment. A WLAN AP receives outgoing user communications from a wireless terminal and incoming user communications for the wireless terminal from a WLAN backbone network interfaced with the AP. These communications are in the form of packetized communications coded according to a coding scheme with a programmable COder/DECoder (CODEC). The programmable CODEC converts incoming user communications from packetized communications and outgoing user communications to packetized communications according to the selected coding scheme.

Packetized communications are exchanged between the servicing AP, the WLAN terminal, and the WLAN backbone network, the VoIP terminal, intelligent VoIP network interface and backbone network, or other network elements known to those skilled in the art, at a communication quality level. These communications are monitored to determine the communication quality level delivered between the servicing AP, the WLAN terminal, the WLAN backbone network, and the far-end terminal. The communications quality can be monitored within switches, routers, handsets, nodes, access points or other elements within the network infrastructure known to those skilled in the art. Monitoring the packetized communications from end-to-end supports the management of the coding scheme and routing of the packetized communications. The CODEC or communication pathway may be revised to improve service by selecting one or more new coding schemes based upon the communication quality level delivered or by selecting a new pathway. This communication quality level depends on the jitter experienced by the communications, the number and frequency of lost packets, the arrival or transmission rate of the packetized communications, and other such factors known to those skilled in the art.

By monitoring the packetized communications from end-to-end, the method can intelligently manage the selected coding scheme and routing of the packetized communications. For example, in one instance, the processor communicates with a far-end terminal to identify an appropriate coding scheme. These coding schemes may include, but are not limited to audio and/or video coding schemes such as Huffman encoding, ITU-T G.711, u-law, A-law, CCITT G.721, CCITT G.723, ITU-T G.726, ITU-T G.723.1, ITU-T G.723.1A, ITU-T G.729, ITU-T G.729A, ITU-T G.729AB, ITU-T G.729E, ITU-T G.728, ITU-T G.722, ITU-T G.722.1, ITU-T G.722.2, GSM-EFR, GSM AMR, IMA/DYI ADPCM, Microsoft ADPCM, LPC-10E, CELP GSM 06.10, shorten, Real Audio, 15 MPEG, ACE and MACE.

In another instance, real or emulated jitter buffers, at any point in the communication pathway, monitor latency. This latency is used to determine the communication quality level between the AP and WLAN terminal, VoIP terminal and intelligent VoIP network interface, or along any network segment. Additionally, the communication quality level delivered between the WLAN terminal and the far-end terminal at any point in the network may also be determined.

This information allows the processor to select the route the communications take by choosing which network segments are used to route the communications or which AP is servicing the communication. In the case of the latter, the APs are queried to determine the expected service quality level from each AP. Then, the WLAN terminal registers with a new servicing AP when the expected service quality level to be provided by the new servicing AP exceeds the expected service quality level provided by the servicing AP by a predetermined service quality level.

BRIEF DESCRIPTION OF THE DRAWINGS

For a more complete understanding of the present invention and the advantages thereof, reference is now made to the following description taken in conjunction with the accompanying drawings in which like reference numerals indicate like features and wherein:

FIGS. 4A-4E provide block diagrams depicting the functions of various embodiments of wireless terminals;

FIG. 8A provides an ideal communication signature of real-time packetized communications;

FIG. 8B provides one example of a non-real-time data communication involving bursts of data;

FIGS. 8C and 8D depict real communication signatures wherein packets of data are dropped;

FIGS. 9A and 9B illustrates the perceived and measured quality level impacts of the dropped packets in FIGS. 8C and 8D;

FIG. 11A provides an ideal communication signature wherein a real-time communication is received in packet sequence order;

FIG. 11B depicts a real communication signature wherein packetized communications are dropped via the wireless link between the wireless terminal and the access point;

FIG. 12A depicts a real communication signature wherein packetized communications are dropped within the network communication pathway;

FIG. 12B depicts a real communication signature wherein packets are received out of order from the network; and FIGS. 13A and 13B depict process flows associated with quality monitoring.

DETAILED DESCRIPTION OF THE INVENTION

Preferred embodiments of the present invention are illustrated in the figures, like numerals being used to refer to like and corresponding parts of the various drawings.

Figure 1A:
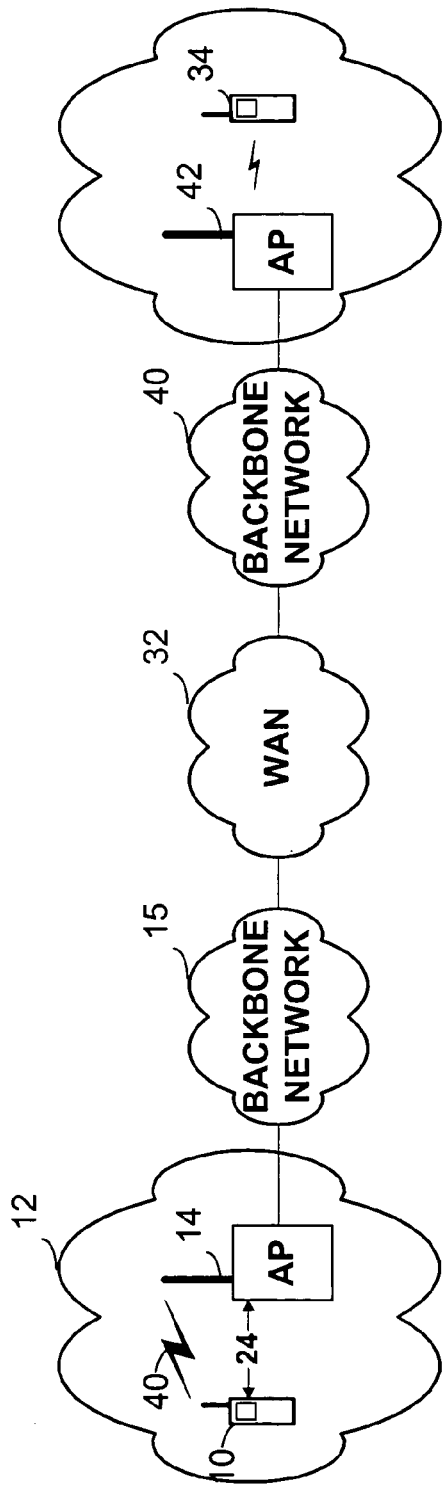
FIGS. 1A and 1B depict communication pathways between wireless terminals and far end terminals.
Figure 2:
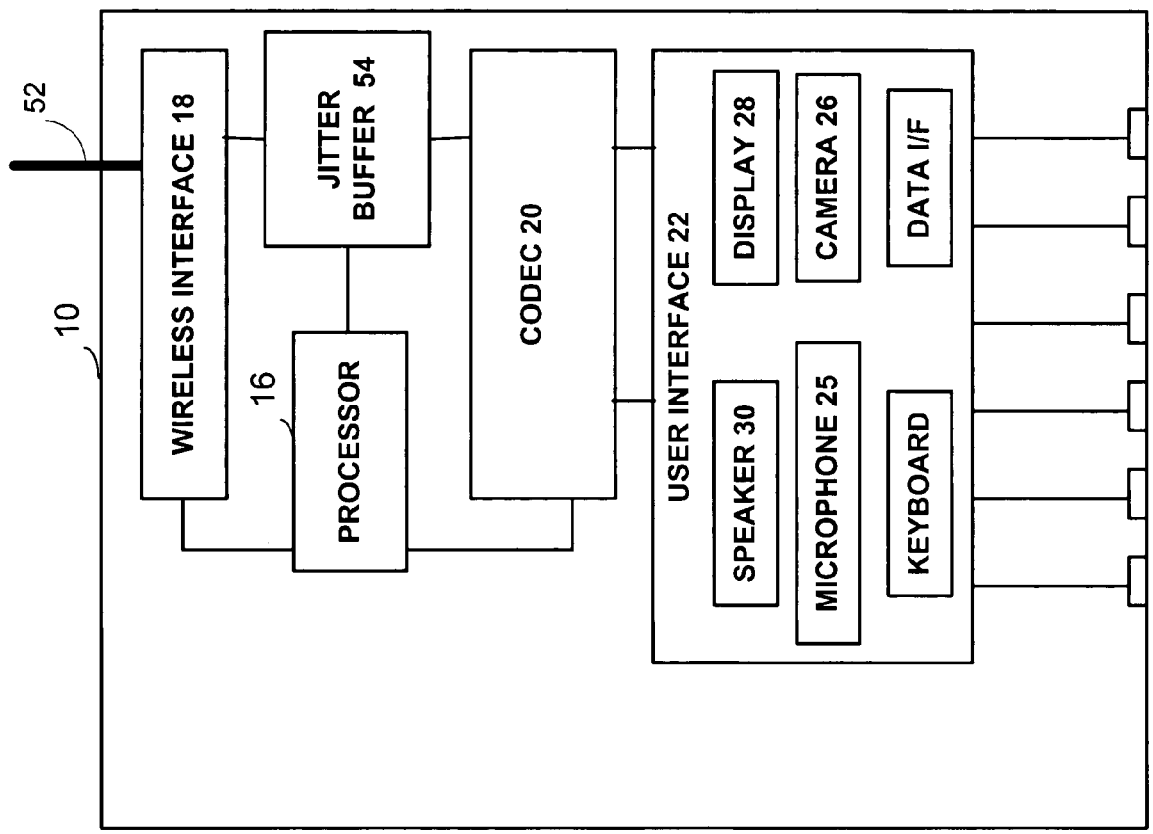
FIG. 2 provides a block diagram that details the functions of the wireless terminal of FIGS. 1A and 1B.

FIG. 1A provides a diagram illustrating a wireless terminal 10 wirelessly coupled to WLAN 12 through AP 14. FIG. 2 further details wireless terminal 10. Processing unit 16 within wireless terminal 10 couples to and directs the functions of wireless interface 18 that communicatively couples to AP 14.

Additionally, processing unit 16 couples to and directs programmable COder/DECoder (CODEC) 20 to convert user information or communications received at user interface 22 into packetized communications. User interface 22 may take the form of a microphone 25, camera 26, or other like device to receive audio and/or visual input from a user. Additionally, the user interface 22 may include a display 28, speaker 30, or other like device to present audio and/or visual information to the user. Packetized communications 24 are exchanged between wireless terminal 10 and AP 14.

Figure 1B:
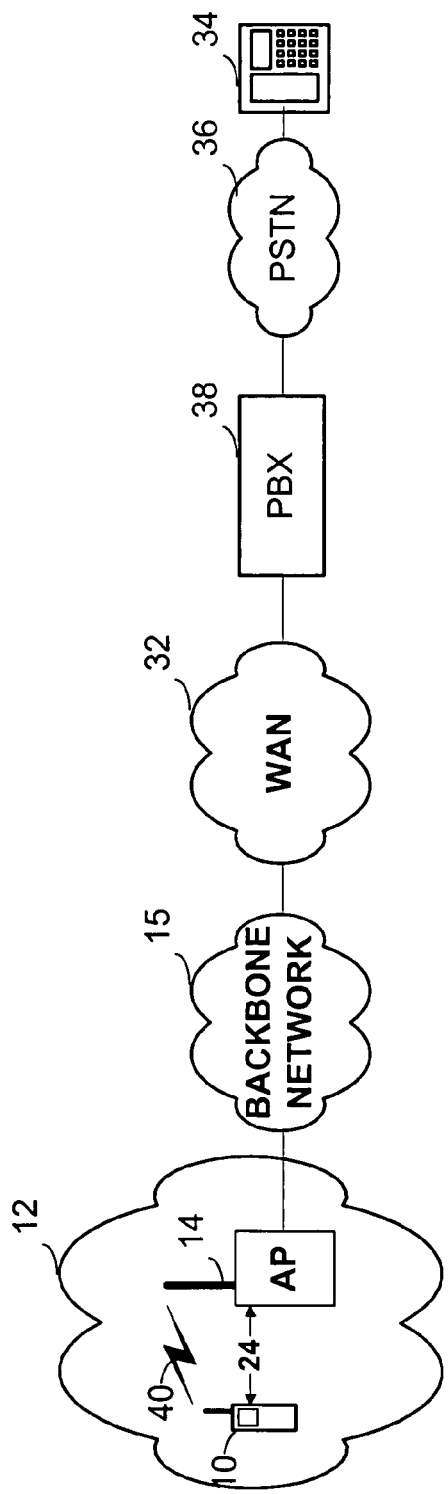

As shown in FIG. 1A, AP 14 broadcasts within WLAN 12 and couples to backbone network 15. As shown, backbone network 15 couples to a wide area network (WAN) 32 that in turn relays the packetized communications to far-end terminal 34. In this first instance, far-end terminal 34 is serviced by a remote wireless local area backbone network 40 having AP 42. It should be noted that the far-end terminal 34 need not be limited to a wireless terminal. For example, a wire-based telephone such as that illustrated in FIG. 1B may act as the far-end terminal. In this example, backbone network 15 couples to the public switch telephone network (PSTN) 36 via a private box exchange (PBX) 38 and delivers audio communications to a far-end terminal 34.

Returning to wireless terminal 10 of FIG. 2, processing unit 16 monitors the packetized communications 24 exchanged between wireless terminal 10 and AP 14 in order to determine a communication quality level delivered by the wireless link that couples wireless terminal 10 to AP 14. Once the communication quality level delivered by wireless link 40 has been determined, processing unit 16 specifies the coding scheme to be employed by CODEC 20 to convert user communications into packetized communications 24. Additionally, processing unit 16 may communicate with far-end terminal 34 to determine the overall delivered communication quality level along the entire communication pathway. Then processing unit 16 can select the coding scheme based on the overall delivered communication quality level.

Some example coding schemes used in audio or video coding include Huffman encoding, ITU-T G.711, u-law, A-law, CCITT G.721, CCITT G.723, ITU-T G.726, ITU-T G.723.1, ITU-T G.723.1A, ITU-T G.729, ITU-T G.729A, ITU-T G.729AB, ITU-T G.729E, ITU-T G.728, ITU-T G.722, ITU-T G.722.1, ITU-T G.722.2, GSM-EFR, GSM AMR, IMA/DVI ADPCM, Microsoft ADPCM, LPC-10E, CELP GSM 06.10, shorten, Real Audio, MPEG, ACE and MACE, as well as others known to those skilled in the art.

Wireless terminal 10 receives packetized communications 24 wirelessly via antenna 52. Wireless interface 18 exchanges the incoming communications with jitter buffer 54. Processing unit 16 monitors jitter buffer 54 to determine its latency. This information may be used to determine the communication quality level delivered by wireless link 40. Based on the measurement of the communication quality level delivered, processing unit 16 may change the selected coding scheme used by CODEC 20 to convert user communications received to and from packetized communications.

Figure 3:
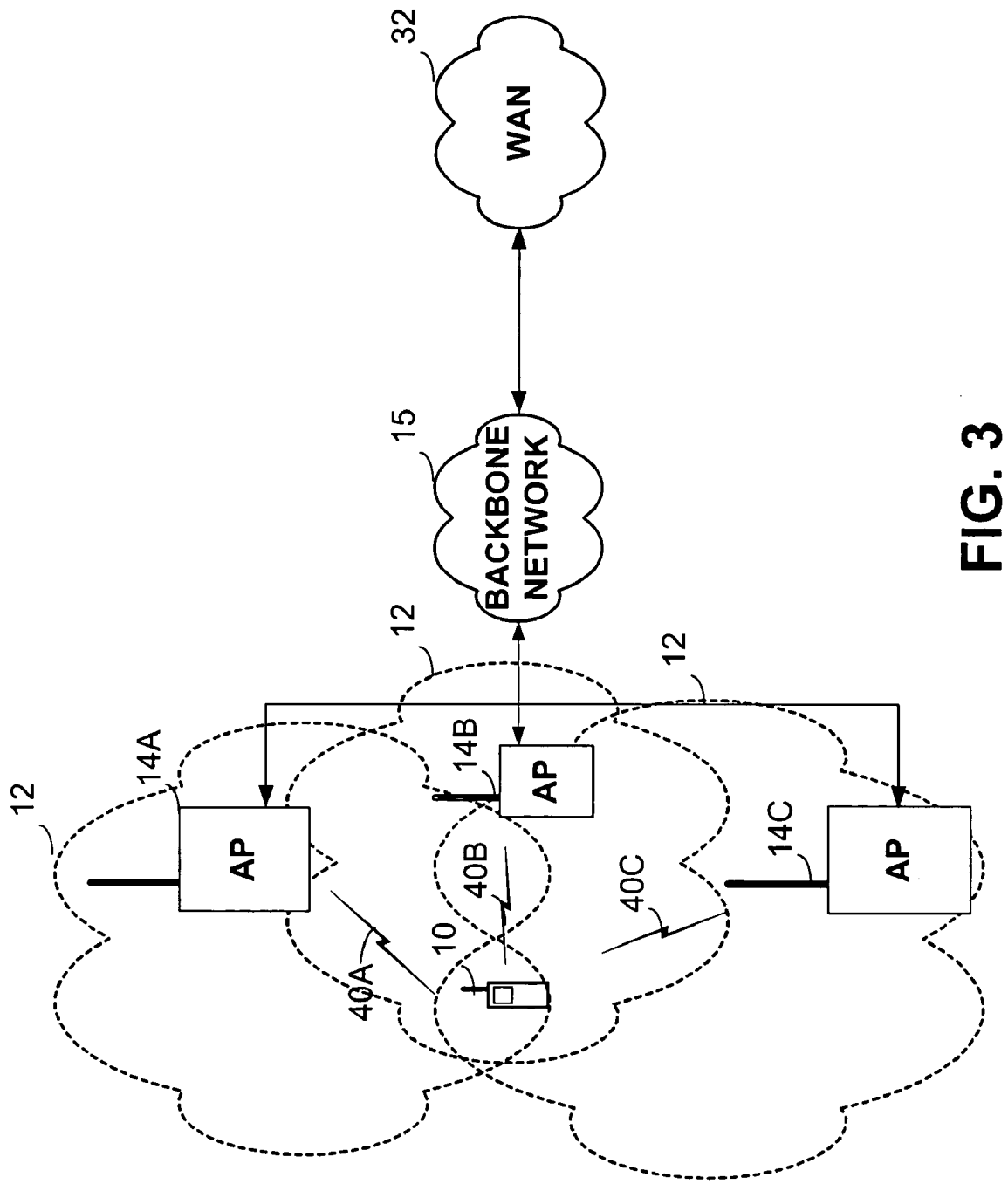
FIG. 3 depicts an embodiment where an individual wireless terminal selects a communication pathway, selects a wireless link to an access point providing the highest level of service.

Processing unit 16 may also monitor various signal pathways in its decision-making process. FIG. 3 depicts a situation wherein wireless terminal 10 has access to APs 14A, 14B and 14C that each couple to wireless local area backbone network 15. This allows processing unit 16 to choose its servicing AP based upon the expected service quality level supplied by individual APs 14A, 14B and 14C. In one instance, this process involves monitoring a number of APs by querying each available AP to determine the service quality level delivered by each individual AP. Wireless terminal 10 then chooses a new AP when the service quality level provided by the new servicing AP exceeds the service level provided by the current servicing AP by a predetermined service level.

Figure 4A:
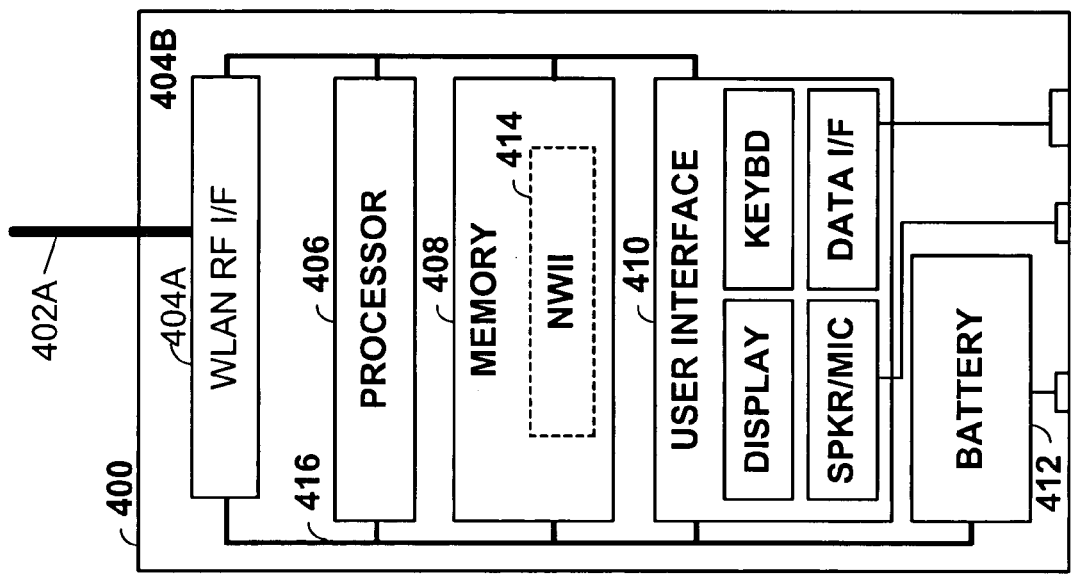
Figure 4B:
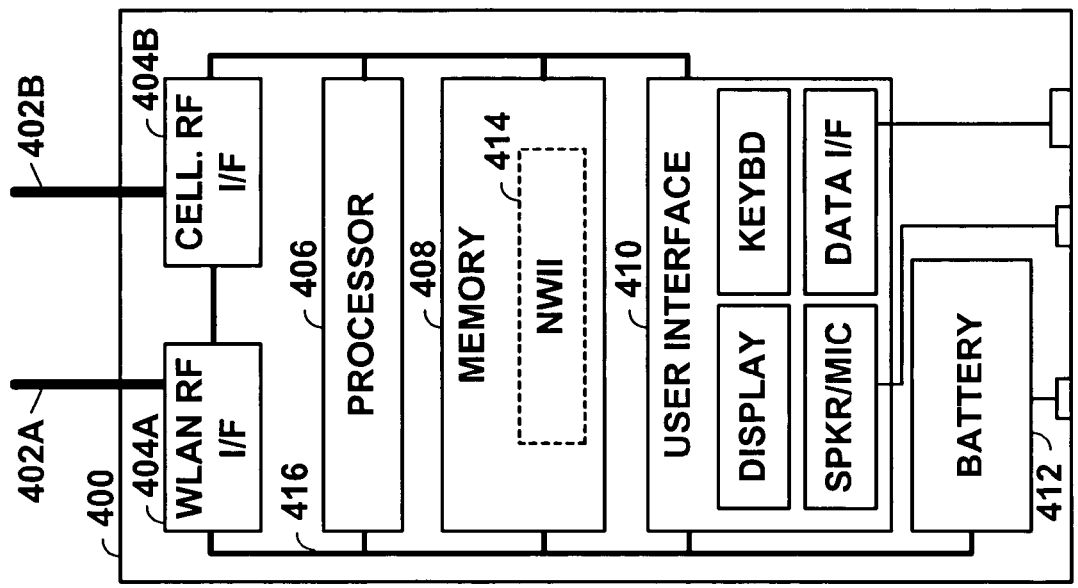
Figure 4C:
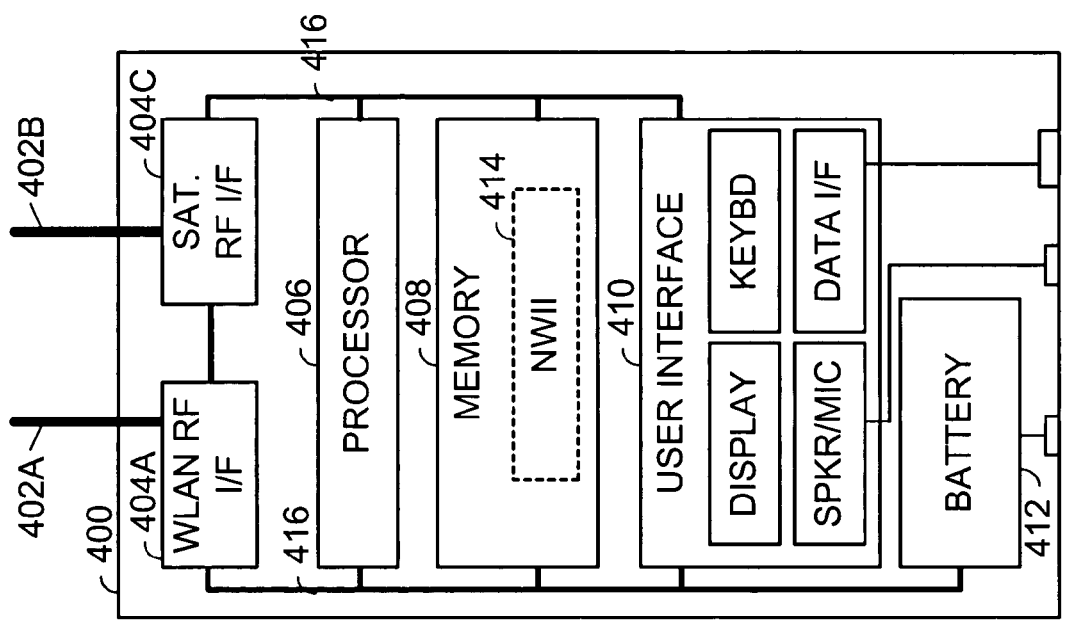
Figure 4E:
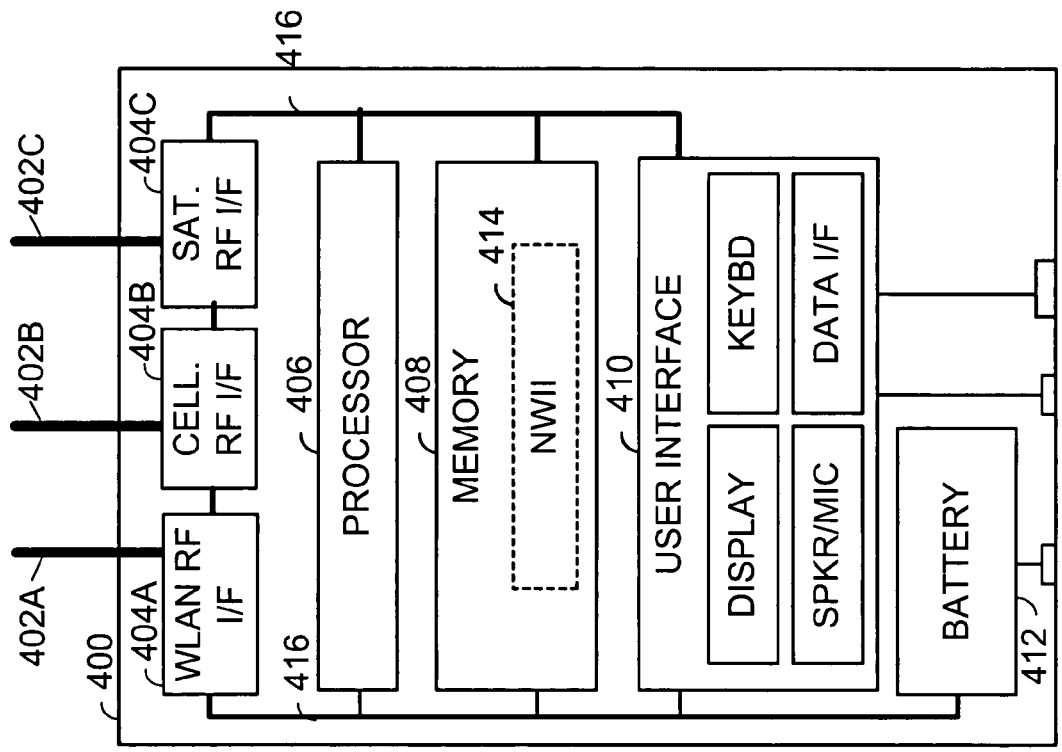

FIGS. 4A-4D provide block diagrams illustrating the typical components of various wireless terminals. FIG. 4A depicts wireless terminal 400 as having only a short-range digital radio WLAN RF unit' 404A that supports Bluetboth@ or like wireless communications with the WLAN. FIG. 4B includes a cellular RF unit 404B that supports wireless communications with the cellular network. FIG. 4C includes a WLAN RF unit 404A and satellite RF unit 404C. FIG. 4D includes WLAN RF unit 404A, cellular RF unit 404B, and satellite RF unit 404C. RF units, 404A, 404B and 404C couple to antennae 402A, 402B and 402C respectively. These antennae 402A, 402B, and 402C may be located internal or external to the case of the wireless terminal 400. Further, in some embodiments, a single RF unit and/or a single antenna may support communications with both the WLAN and the cellular network. Processor 406 may be an Application Specific Integrated Circuit (ASIC) or another type of processor capable of operating the wireless terminal 400 according to this disclosure. Memory 408 includes both static and dynamic components, e-g., DRAM, SRAM, ROM, EEPROM, etc. In some embodiments, the memory 408 may be partially or fully contained within an ASIC that also includes the processor 406. A user interface 410 includes a display, indicators, a keyboard, a speaker, a microphone, and/or a data interface, and may include other user interface components known to those still in the art. RF interfaces 404A, 404B, and 404C, processor 406, memory 408, and user interface 410 couple via one or more communication buses/links 416. Battery 412 or power port 418 couples to and powers RE interfaces, processor, memory and the user interface.

Figure 5A:
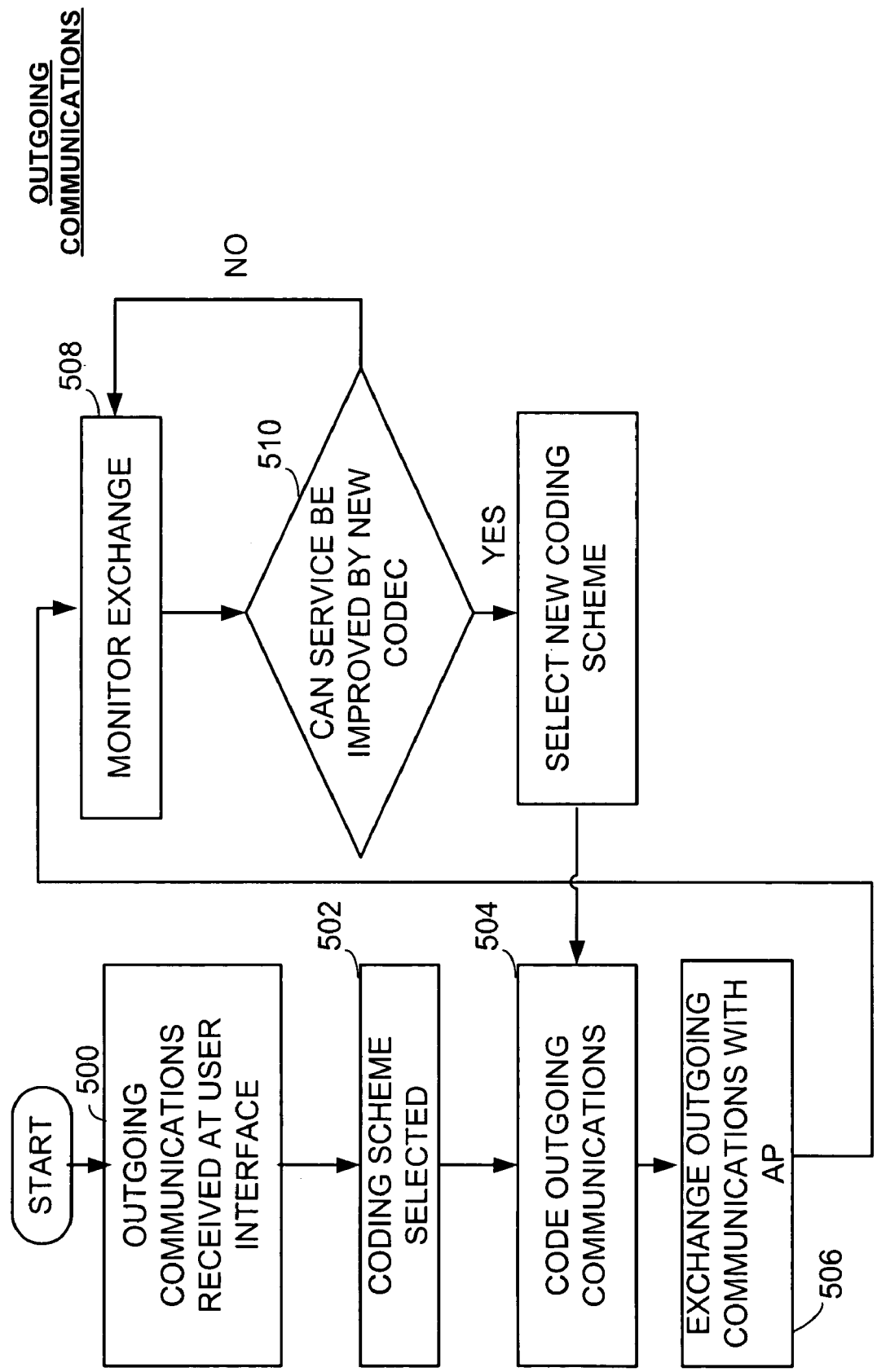
FIG. 5A depicts a flow chart detailing the processes associated with selecting the appropriate coding scheme for outgoing user communications.
Figure 5B:
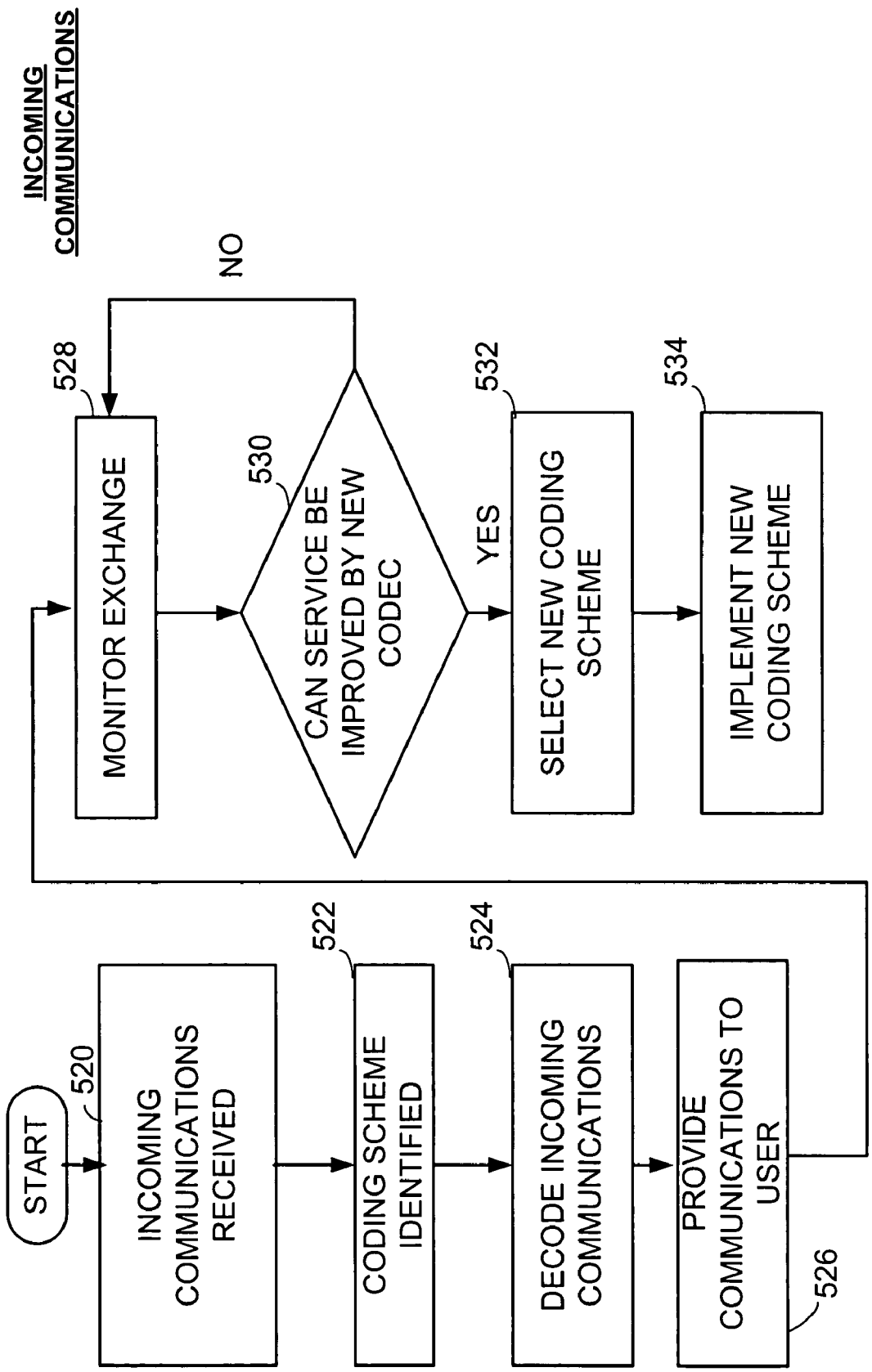
FIG. 5B depicts the selection of a coding scheme associated with incoming communications at the wireless terminal.

FIG. 5A provides a flowchart that depicts the servicing of real-time communications through a wireless terminal. At Step 500, outgoing communications are received at the user interface of the wireless terminal. These user communications may take the form of either audio or visual communications. An initial coding scheme, selected at Step 502, is utilized to code outgoing communications into packetized communications at step 504. FIG. 5B depicts incoming communications and utilizes the coding scheme to convert the incoming packetized communications to a format more readily used by the user. Outgoing packetized communications are exchanged between the wireless terminal and servicing AP at a given packetized rate in Step 506. This exchange is monitored in Step 508 to determine the communication quality level supported between the AP and the wireless terminal. By monitoring the exchange of packetized communications between the AP and the wireless terminal, the maximum delivered communication rate between the AP and the wireless terminal may then be used at decision point 510 to determine if the measured or perceived service can be improved by selecting a new coding scheme. If an improvement can be effected, a new CODEC is selected at step 512 and used in step 504 to convert new user communications into packetized communications. Otherwise, the processor continues to monitor the exchange of packetized communications in step 508.

FIG. 5B provides a flow chart illustrating the processes associated with receiving incoming packetized communications at the wireless terminal via the AP. At step 520, incoming packetized communications from the network are received at the wireless terminal. The processor identifies the coding scheme associated with these packetized communications in step 522. These communications are converted into user communications at step 524 and provided to the user through an interface at step 526. Simultaneously, the device monitors the communication quality level between the wireless terminal and the AP, and potentially the far-end terminal in step 528.

During the monitoring, a continuous evaluation is made as to whether or not the measured or perceived service can be improved with an alternative coding scheme at decision point 530. If it cannot, monitoring continues at step 528. Otherwise, a new coding scheme is selected in step 532, and implemented with the far-end terminal in step 534. New communications received should then be coded in accordance with the selected coding scheme as the process begins again at step 520.

Figure 5C:
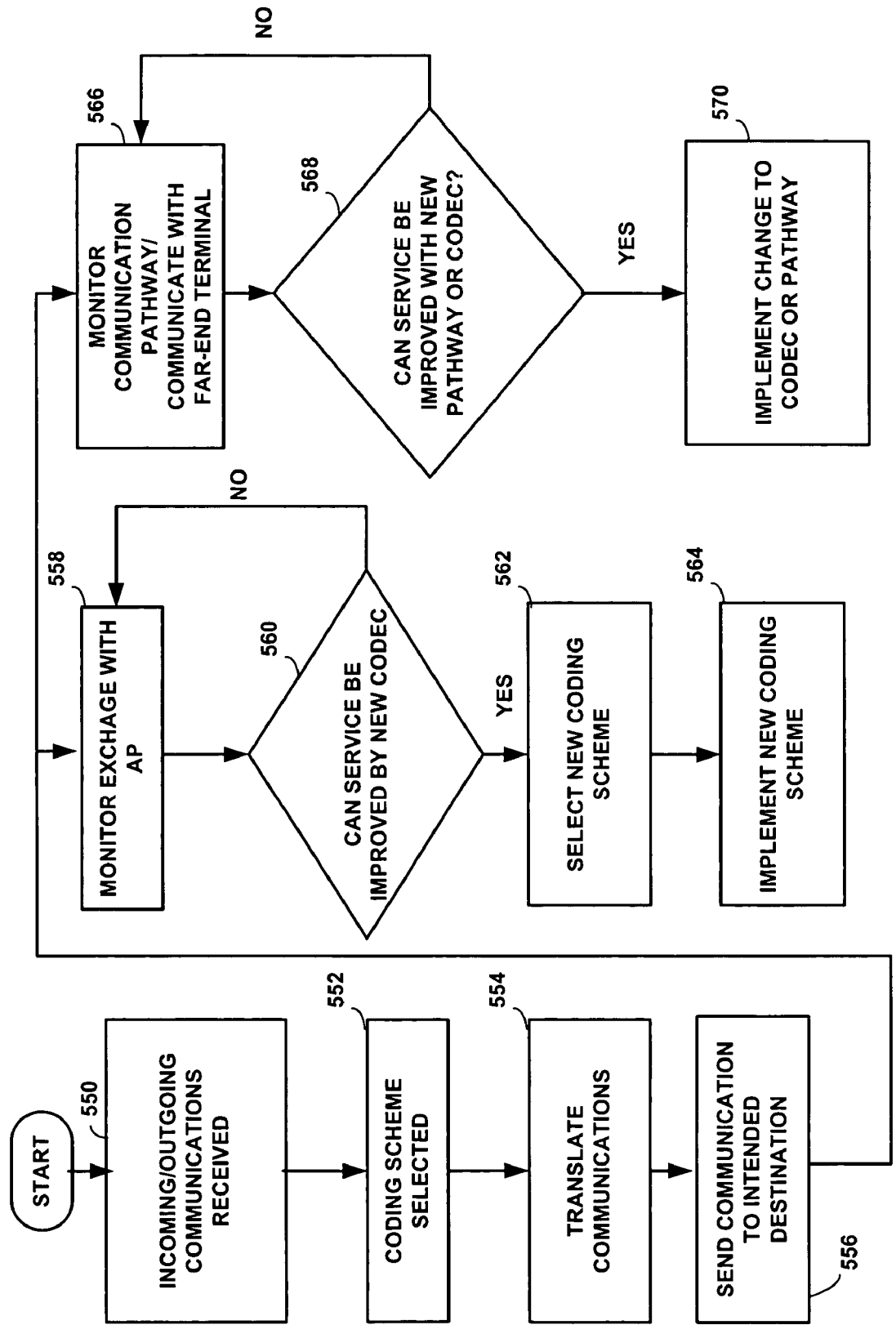
FIG. 5C depicts a process by which incoming and outgoing communications are received and the coding scheme and communication pathway are monitored and evaluated for potential changes which would improve the measured and perceived quality of the serviced communication.

FIG. 5C illustrates the receipt of incoming and outgoing communications at a user interface in step 550. An initial coding scheme, selected at step 552, is employed in step 554 to translate between user communications and packetized communications. Packetized communications are exchanged between the wireless terminal and the APs at step 556. As previously stated, the exchange process is monitored to determine the delivered communication quality level between the wireless terminal and APs in step 558. At decision point 560, a determination is made as to whether or not a need exists to revise the CODEC. The revised CODEC is selected and implemented in steps 562 and 564 respectively. Otherwise, the processor continues to monitor the exchange of packetized communications.

The monitoring process may also evaluate the communication pathways used to exchange packetized communications between the wireless terminal and the far-end terminal in step 566. Alternatively, communications between both end points may determine the appropriate CODEC or communication pathway. The process answers this question at decision point 568 and implements changes at step 570 or continues to evaluate at step 566.

In this embodiment, the overall communication quality level delivered across the entire communication path maybe evaluated. The decision to revise the selected CODEC at the above decision points now may consider the overall communication quality level and/or network/hardware considerations. Additionally, communications between the wireless terminal and the far-end terminal may identify a CODEC supported by both the far-end terminal and wireless terminal.

The process of monitoring packetized communications between end points may include monitoring the latency of packetized communications within the jitter buffer within the wireless terminal or VoIP terminal. As will be discussed later, this process may also be repeated or emulated at the AP or various nodes within the communication pathways that link the wireless terminal to the far-end terminal.

Figure 6A:
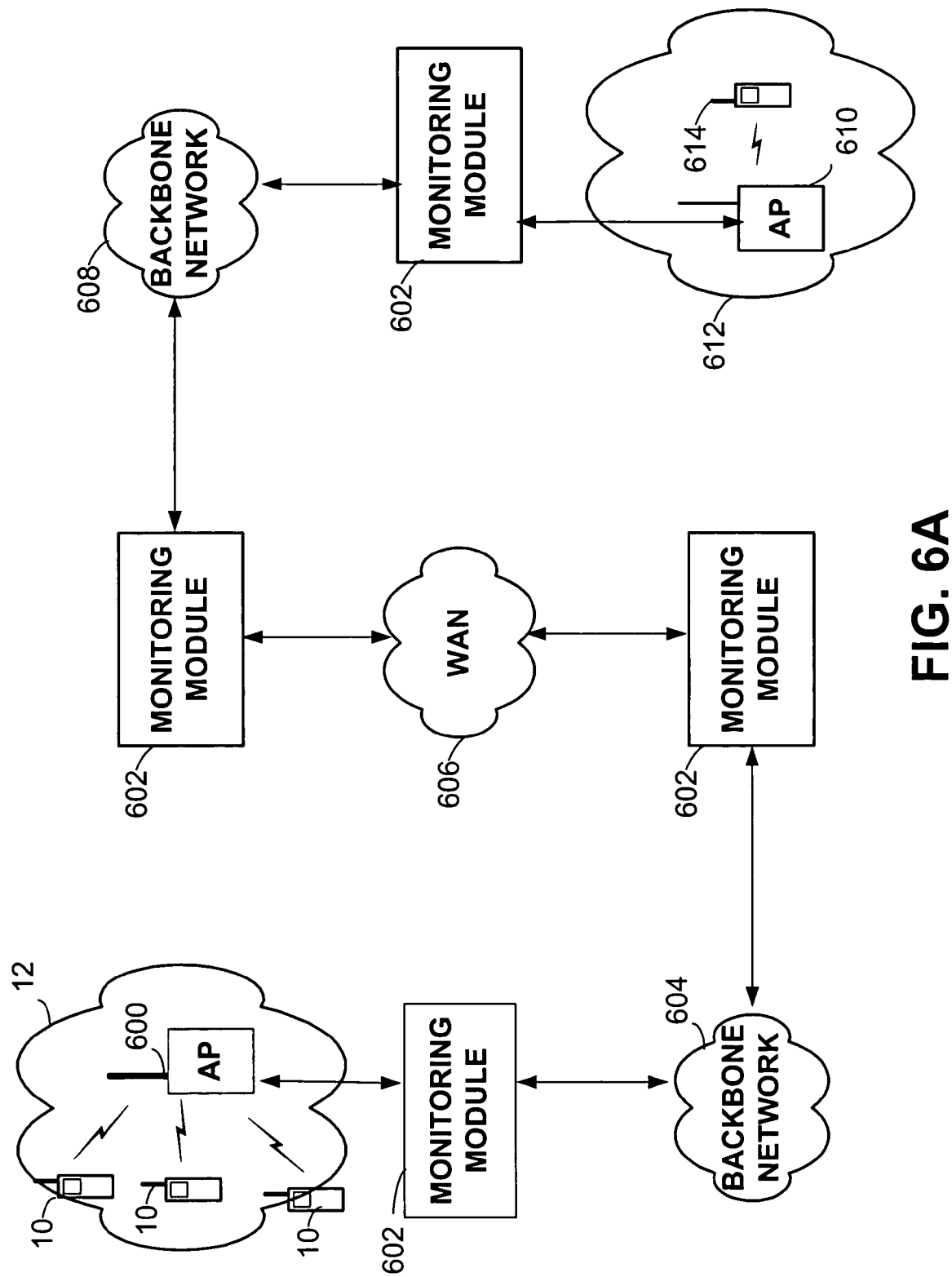
FIGS. 6A and 6B depict an embodiment wherein the decision making process may be executed by a processor within either an access point or a quality monitoring module.
Figure 6B:
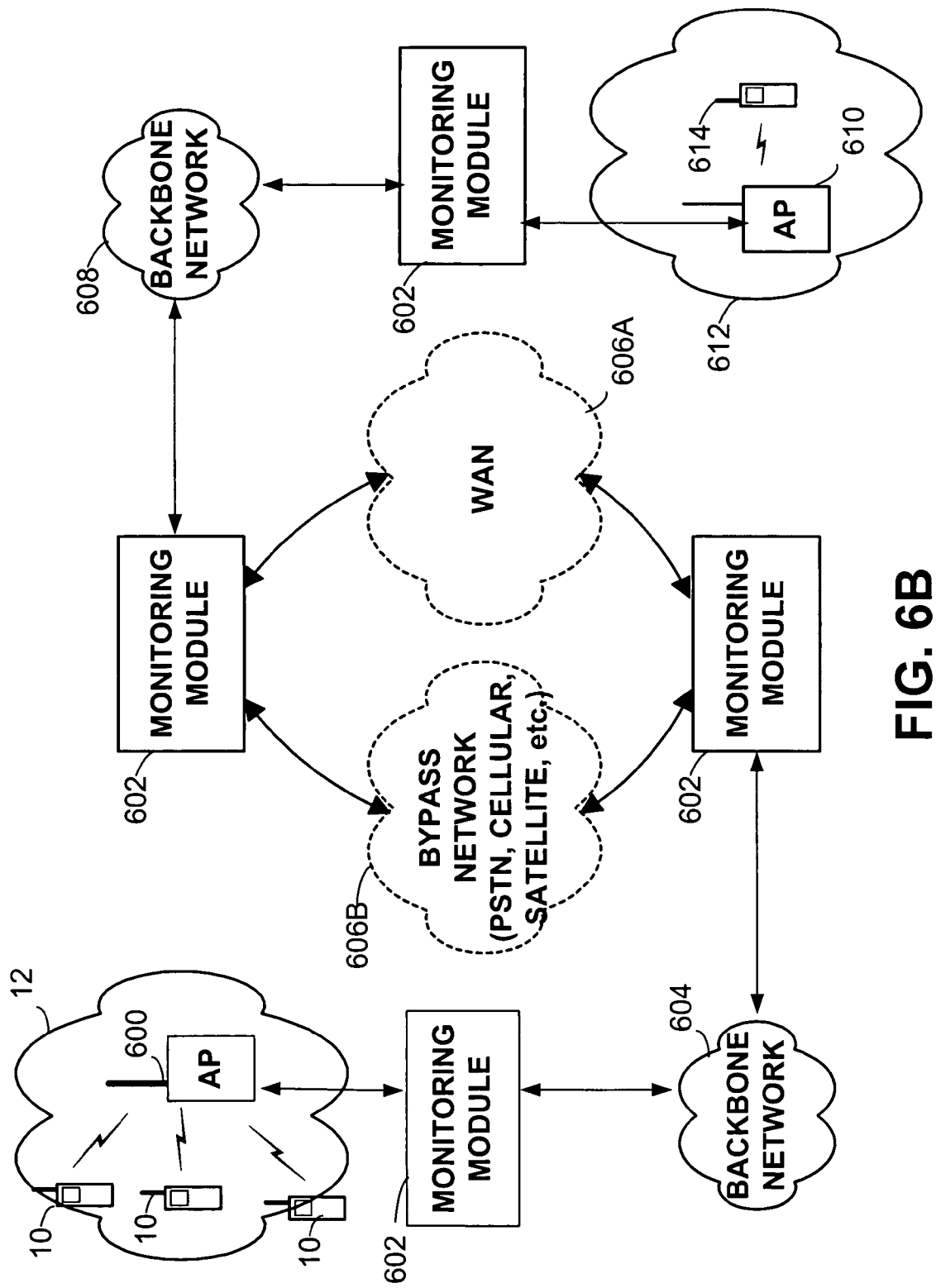

FIGS. 6A and 6B detail embodiments where the processing and decision-making process does not need to occur within wireless terminal 10. Here, wireless terminal 10 is wirelessly linked to AP 600. AP 600 services WLAN 12. One embodiment of AP 600 is further detailed in FIG. 7A.

Figure 7A:
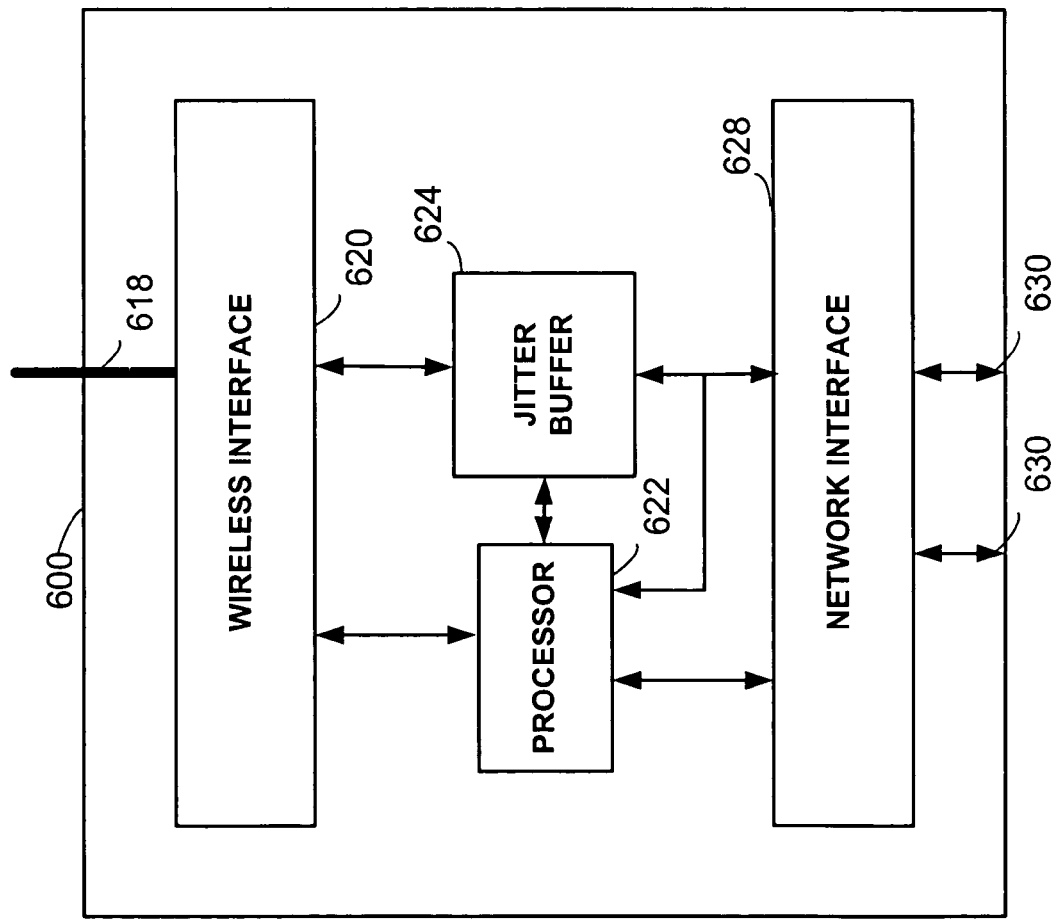
FIG. 7A depicts the internal functions of a wireless AP having the ability to monitor and make quality decisions on the exchange of packetized communications through the wireless AP.

In FIG. 7A, a wireless connection links wireless terminal 10 to antenna 618 and wireless interface 620 of AP 600. Processor 622 monitors and directs wireless interface 620, jitter buffer 624, and network interface 628. Processor 622 identifies and examines the communication signatures of packetized communication from wireless terminal 10 to determine if the communication is a real-time communication or non-real-time communication. A priority based on the communications real-time requirements is assigned for the serviced communication. Additionally, processor 622 evaluates the coding scheme and communication pathways used between wireless terminal 10 and the intended far-end terminal. Processor 622 determines how the communication should be routed and assigns a coding scheme and communication pathway that provides a predetermined level of service for the real-time communication. Furthermore, processor 622 may communicate with wireless terminal 10 in order to direct which coding scheme is to be used by the programmable CODEC, with the terminals.

In one example, processor 622 may examine the packetized communications exchanged between wireless terminal 10 and wireless interface 620 to determine the communication quality level delivered by the wireless link. When the wireless link is limiting, processor 622 may employ a coding scheme based on the communication quality level delivered by the wireless link. Additionally, by examining jitter buffer 624, processor 622 determines the latency associated with these buffers and assigns an appropriate coding scheme based on that latency. Processor 622 also interfaces with network interface 628 to direct the exchange of packetized communications between AP 600 and the backbone network or other network components in the communication pathway between wireless terminal 10 and the destination terminal.

Figure 7B:
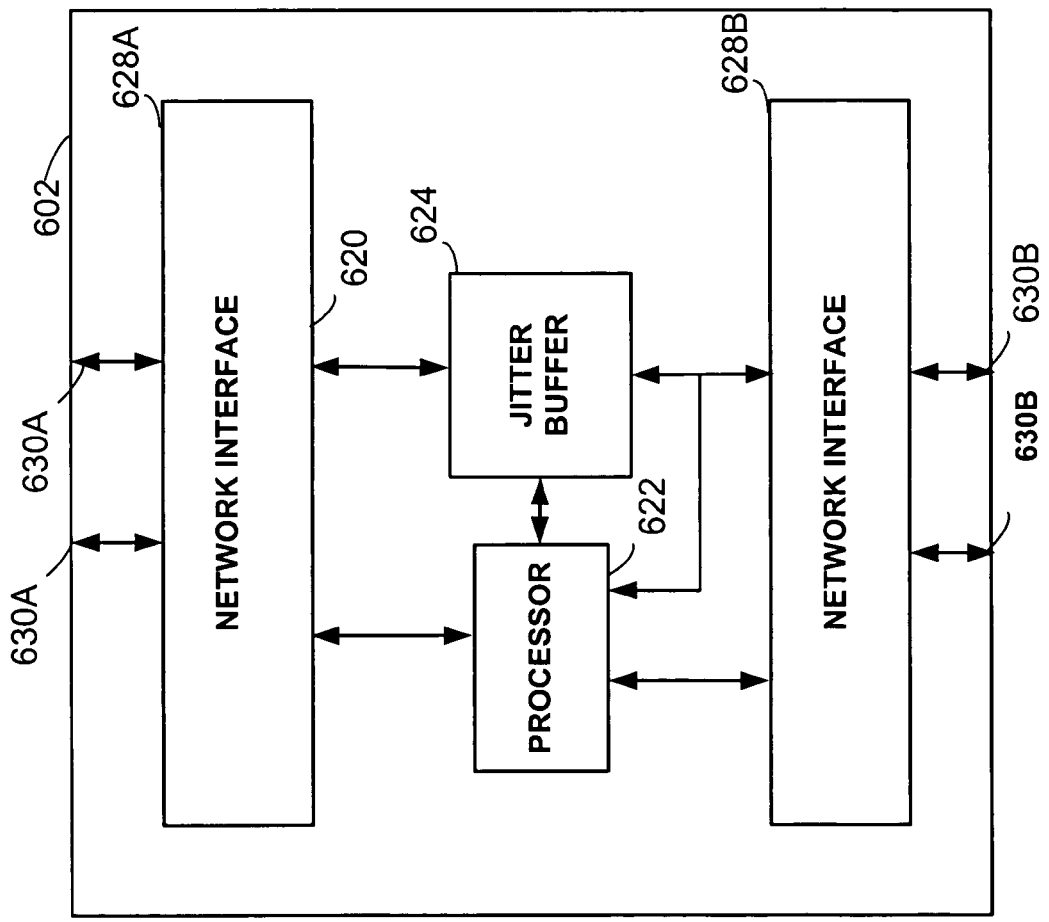
FIG. 7B depicts a quality-monitoring module located within the network. The module is capable of monitoring, evaluating and acting on information contained within the communication signatures of packetized communications passing through the quality monitoring module.

These same processing functions may be achieved with a quality-monitoring module 602 further detailed in FIG. 7B. If the WLAN AP with which the wireless terminal communicates does not have the ability to monitor and evaluate packetized communications, these functions may be supported by quality monitoring module 602. Additionally, these modules, when located at nodes within the pathway, may supplement the functions of APs having these abilities.

FIG. 7B shows that network communications maybe received at network interface 628A via port 630A. As previously stated, the network interface couples to processor 622 and jitter buffer 624. The communications then pass from network interface 628B and ports 630B to the other segments in the network.

Returning to FIG. 6A, it should be further noted that quality-monitoring modules 602 might be located within any network segment or at any network vertices such as those between backbone network 604 and WAN 606, as well as backbone network 608 and WAN 606. FIG. 6A shows that wireless terminal 10 communicates with far-end terminal 614 along the communication pathway shown. It should be understood that the monitoring modules are optional as AP 600, as configured in FIG. 7A, has the ability to process and evaluate the packetized communications exchanged between the network and wireless terminal 10.

FIG. 6B includes a bypass network such as PSTN, cellular, satellite, or other like network known to those skilled in the art. In this instance, quality-monitoring modules 602 may direct that if the primary communication pathways are unable to support the real-time communications between wireless terminal 10 and far-end terminal 614, then a bypass network 606B, such as one or more of those identified above, may be used in favor of WAN 606A. Quality monitoring modules 602, in addition to evaluating communication quality levels delivered by the network, and the coding schemes employed, may further direct that non-real-time communications receive a lower priority or be temporarily stored in a buffer, or be delayed to support real-time communications.

One process accomplished by processor 622 in either AP 600 or quality monitoring module 602 is to determine whether or not the communications received from wireless terminal 10 are above or below a predetermined communication quality level threshold. The determination as to whether or not the communications are real-time communications or non-real-time communications may be determined by the protocols associated with the communications. For example, RTP protocols may identify real-time communications. FIG. 8A provides an example of an ideal packetized communication signature associated with a real-time communication from the wireless terminal. FIG. 8B depicts one possible signature of data communications that contain large amounts of data in relatively small bursts 804. Thus, the processor may also evaluate these communication signatures to determine which communications are real-time communications and to assign a predetermined level of service to those real-time communications. This evaluation of the communication signature is important where non-real-time protocols are used to convey real-time communications.

FIGS. 8C and 8D show real-time communications with some data loss. Losses of individual packets of packetized communications impact the quality that the user perceives at the wireless terminal. It is important to maintain a perceived level of quality for the end user. This results in subscriber retention and increased user satisfaction. Ideally, VoIP systems should approach or exceed the quality of traditional telephony systems.

Figure 10:
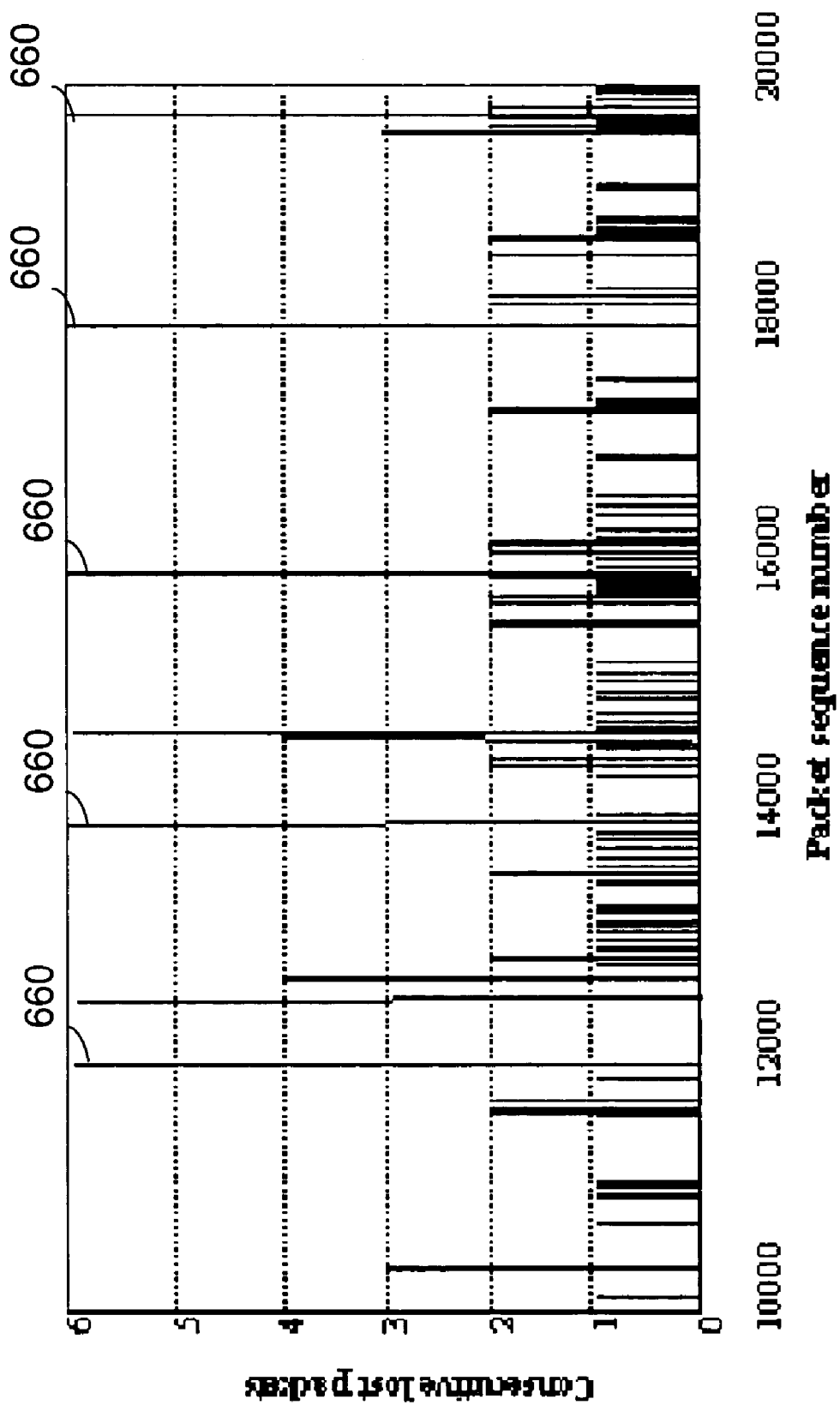
FIG. 10 depicts that packets are typically lost in bursts.

FIGS. 9A and 9B depict the effects of the dropped packets in FIGS. 8C and 8D on the user's perceived quality. FIG. 9A shows that packet sequence 2 is lost as indicated by the gap L1. Gap L2 indicates the loss of packet sequence 7. These losses result in a reduced overall quality. Line 650 indicates the measured communication quality while dotted line 652 indicates the user's perceived communication quality. Line 650 depicts the measured communications quality as varying between a high quality and a low quality. Somewhere in between is a minimum average service to be maintained in order to ensure end user satisfaction. FIG. 9B depicts an instance when the same number of packetized communications is lost. However the packets lost are consecutive or form a burst at gap L1. This loss has a much more pronounced effect on the user's perceived quality of the communications than the small non-burst losses seen in FIG. 9A. FIG. 9B depicts a large gap wherein the perceived quality 652 dropped below the minimum service level for the communications. The fact that lost packets typically occur in bursts is indicated by the data represented in FIG. 10 wherein consecutive lost packets versus packet sequence number are provided. Spikes 660 indicate large losses of data. These typically are large consecutive losses of packetized communications.

The time that it takes for the perceived quality of the communications to rise above a minimum acceptable level is a function of the recovery from the loss of data, and the coding scheme used. Some coding schemes may more quickly compensate for recently lost packets. FIG. 11A depicts an ideal communication signature between a wireless terminal and an AP wherein a real-time communication having a series of packetized communications 24 are received in the proper packet sequence order and contain approximately the same amount of information. In contrast, FIG. 11B depicts one example of a real communication signature between the wireless terminal and the AP wherein some packetized communications 24 are dropped in packet sequence order. Thus, the quality monitor for the signatures depicted in FIGS. 11A and 11B may choose different coding schemes. FIG. 11A does not require a rapid recovery from dropped packets. However, FIG. 11B requires the processors to select the scheme that provides the highest level of perceived quality and minimizes the effect of dropped packets. Additionally, the quality monitor may seek to service a wireless terminal with an alternative AP in order to avoid dropped packetized communications if a second AP is available to provide a higher level of service.

Network communications received from the far end terminal by the quality monitor should be received in packet sequence order and in a timely fashion. However, FIG. 12A provides the communication signature of packetized communications received from another segment in the network when packets are dropped. FIG. 12B depicts a communication signature wherein packets are received out of packet sequence order. Both instances may affect the perceived quality of the communication; the quality monitor may evaluate these communication signatures and direct an appropriate course of action. For example, in FIG. 12A, where packetized communications 24 that correspond to packet sequence nos. 2 and 7 are dropped in order, the quality monitor may elect a coding scheme better suited to maintain a high level of perceived quality when occasional packetized communications 24 are dropped. Additionally, when packetized communications 24 contain routing information, a determination can be made as to the network segment at which the packetized communications corresponding to the dropped packet sequence numbers. Then, the dropping network segment may be removed if possible from the communication pathway. In an instance where this is not possible, the quality monitor may direct an alternative communication pathway such as that provided by bypass network 606B of FIG. 6B.

FIG. 12B indicates that while no packetized communications 24 were dropped, latency problems caused the packetized communications to be received out of sequence. As shown here, the packetized communications corresponding to packet sequence nos. 7, 6, 5, and 2 were received out of order. In certain cases, these packets will be discarded. These packetized communications are analyzed to determine the root cause of their delay and the network impediment, which may be removed, if possible, or a coding scheme revised to handle packetized communications received out of order while still allowing the perceived quality of the communication to remain high. Alternatively, a bypass network may be utilized if reconfiguring the communication pathway and revising the coding scheme does not provide the desired level of service.

FIG. 13A provides a process flow by which the quality monitors associated with either the APs or quality-monitoring modules within the network are able to receive outgoing communications at the quality monitor (processor) in step 700. The quality monitor determines, based on the communication signature associated with the outgoing communications, whether or not the communication is a real-time communication in step 702. In which case, real-time communications are prioritized at step 704 and non-real-time communications may be delayed dependent upon the bandwidth requirement of current communications. Then, a coding scheme consistent with the communication signature or communication pathway consistent with the communication signature may be selected at step 706. The process continually repeats for ongoing communications in order to ensure that the highest possible levels of communications are provided to the end user.

Figure 13B:
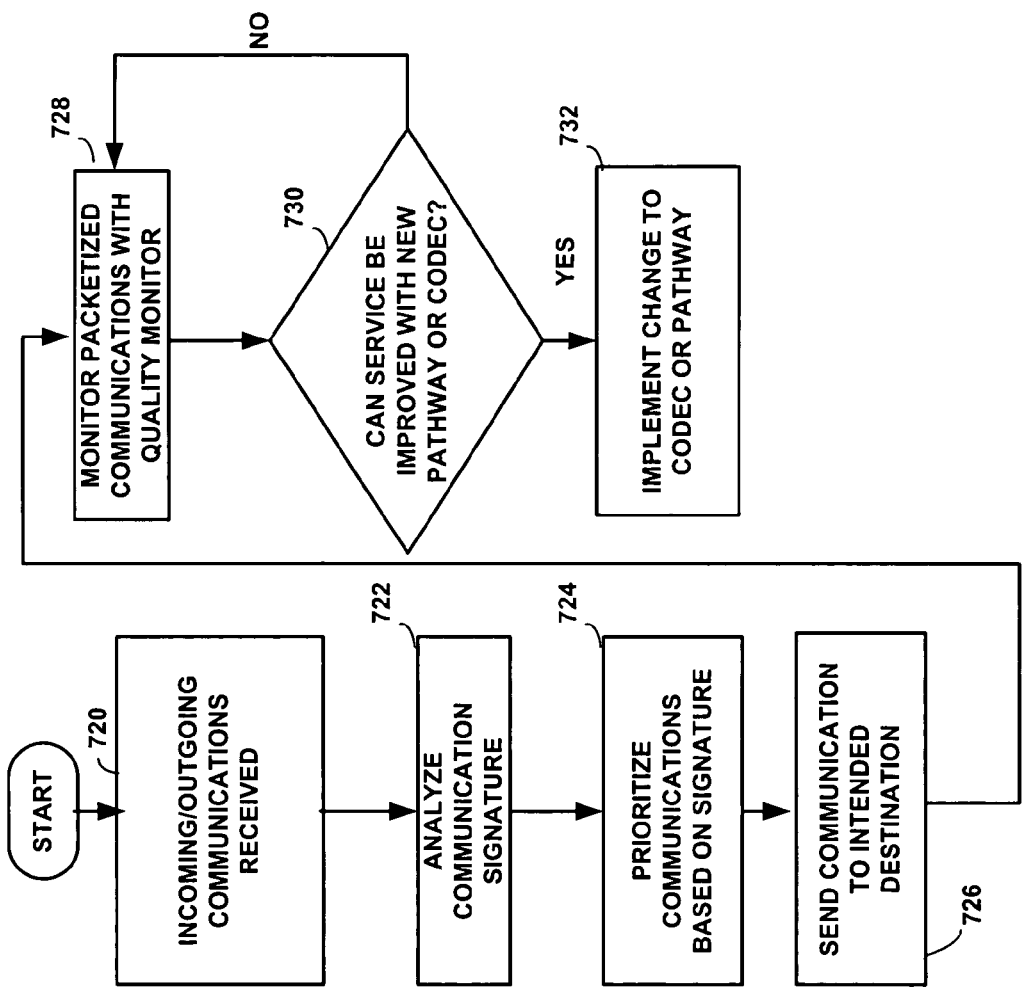

FIG. 13B also provides a process flow wherein communications are received by a quality monitor at Step 720. Communications signatures are analyzed at Step 722 in order to prioritize the communications and send them to their intended destination at steps 724 and 726 respectively. The quality monitor continuously monitors these communications at step 728 and evaluates whether or not service can be improved with either a new communication pathway or coding scheme at step 730. If service may be improved, the necessary change is implemented at step 732. Otherwise, the evaluation process continues at step 728.

In summary, this disclosure provides the ability to incorporate quality monitors either into wireless terminals, wireless access points, or other network modules. These quality monitoring functions monitor, in real-time, the measured and perceived quality of real-time communications. In addition to monitoring these levels of quality, communication pathways and coding schemes may be dynamically reconfigured to improve the measured and perceived level of quality. This has particular applications to VOIP and other like streaming multimedia applications. Such applications enable providers to maintain a high level of user satisfaction while minimizing the impact on network resources. Additionally, quality monitors support dynamic mixed usage of network bandwidth such that voice data and other multimedia communications are prioritized based on their immediate need when compared to other data communications. Thus, the quality monitors support dynamic bandwidth sharing amongst the different types of communications. This ability minimizes network-operating costs and provides real-time communications such as VOIP at quality levels that can reach or exceed traditional telephony levels.

Although the present invention is described in detail, it should be understood that various changes, substitutions and alterations can be made hereto without departing from the spirit and scope of the invention as described by the appended claims.

What is claimed is:

1. An apparatus, comprising:
   a first network interface coupled to service packetized communications with at least one Voice over Internet Protocol (VoIP) terminal within a first network;
   a second network interface coupled to service the packetized communications with the at least one VoIP terminal via a second network;
   a processor coupled to the first network interface and to the second network interface; and
   a programmable codec, coupled to the processor, that employs a corresponding coding scheme to encode or decode each of the packetized communications; and wherein:
   the processor determines a communication signature for each of the packetized communications;
   the processor determines, based upon a corresponding communication signature, whether a packetized communication is a real-time communication;
   when the packetized communication is the real-time communication, the processor initially directs packetized communications with the at least one VoIP terminal to be serviced within the first network using the first network interface and monitors a first service level at which the real-time communication is supported within the first network;
   when the first service level is below a minimal service level within the first network, the programmable codec changes from a first coding scheme by which the real-time communication is encoded or decoded therein to a second coding scheme;
   the processor monitors a second service level at which real-time communication is supported within the first network using the second coding scheme; and
   when the second service level is below the minimal service level within the first network, the processor directs packetized communications with the at least one VoIP terminal to be serviced within the second network using the second network interface.

2. The apparatus of claim 1, wherein:
   the programmable codec employs the first coding scheme to encode or decode a first packetized communication of the packetized communications; and the programmable codec employs the second coding scheme to encode or decode a second packetized communication of the packetized communications.

3. The apparatus of claim 1, wherein:
the processor determines, based upon a corresponding communication signature, whether a packetized communication is a non real-time communication; and
when a non real-time communication is identified, its service level is adjusted to be relatively lower than a service level of the real-time communication.

4. The apparatus of claim 1, wherein:
the second network includes a first servicing network and a second servicing network; and
if a service level at which the real-time communication may be supported when communicated via the first servicing network is below the minimal service level, the real-time communication is rerouted via the second servicing network.

5. The apparatus of claim 1, wherein the processor prioritizes the real-time communication over non real-time communication.

6. The apparatus of claim 1, wherein each packetized communication has associated therewith a pair of communication signatures that includes a receive signature corresponding to communications received from the at least one VoIP terminal via the first network interface and a transmit signature corresponding to communications received via the second network interface and intended for the at least one VoIP terminal.

7. The apparatus of claim 6, wherein the receive signature is primarily employed to determine whether the packetized communication is the real-time communication.

8. The apparatus of claim 6, wherein the receive signature indicates a problem with the apparatus.

9. The apparatus of claim 6, wherein the transmit signature indicates a problem with communications within the second network.

10. The apparatus of claim 1, wherein the packetized communication is an audio communication.

11. The apparatus of claim 1, wherein the packetized communication is an audio-visual communication.

12. The apparatus of claim 11, wherein the audio-visual communication is a video conferencing communication.

13. The apparatus of claim 1, wherein:
the programmable codec initially employs a third coding scheme by which the real-time communication is encoded or decoded within the second network;
the processor monitors a third service level at which real-time communication is supported within the second network using the third coding scheme; and
when the third service level is below the minimal service level within the second network, the programmable codec changes from the third coding scheme by which the real-time communication is encoded or decoded therein to a fourth coding scheme.

14. The apparatus of claim 13, further comprising:
a third network interface, coupled to the processor, and also coupled to service packetized communications with the at least one VoIP terminal within a third network; and wherein:
the processor monitors a fourth service level at which real-time communication is supported within the second network using the fourth coding scheme; and
when the fourth service level is below the minimal service level within the second network, the processor directs packetized communications with the at least one VoIP terminal to be serviced within the third network using the third network interface.

15. The apparatus of claim 1, further comprising:
a plurality of access points (APs) within the first network, each of the plurality of APs is able to support the packetized communications with the at least one VoIP terminal within the first network; and wherein:
each of the plurality of APs supports a corresponding expected service quality level; and
the processor selects one of the plurality of APs to support the packetized communications with the at least one VoIP terminal within the first network based on its corresponding expected service quality level.

16. The apparatus of claim 1, further comprising:
a plurality of access points (APs) within the first network, each of the plurality of APs is able to support the packetized communications with the at least one VoIP terminal within the first network; and wherein:
the processor queries each of the plurality of APs to determine a corresponding service quality level supported thereby; and
the processor selects one of the plurality of APs to support the packetized communications with the at least one VoIP terminal within the first network based on its determined, corresponding service quality level.

17. The apparatus of claim 1, wherein:
the apparatus is an access point (AP).

18. The apparatus of claim 1, wherein:
the apparatus is a wireless terminal.

19. The apparatus of claim 1, wherein:
the first network interface is a wireless local area network (WLAN) radio frequency (RF) interface; and
the second network interface is a cellular RF interface.

20. The apparatus of claim 1, wherein:
the first network interface is a wireless local area network (WLAN) radio frequency (RF) interface; and
the second network interface is a satellite RF interface.

21. The apparatus of claim 1, wherein:
the first network interface is a cellular radio frequency (RF) interface; and
the second network interface is a satellite RF interface.

22. The apparatus of claim 1, further comprising:
a third network interface coupled to service packetized communications with the at least one VoIP terminal within a third network.

23. The apparatus of claim 22, wherein:
the first network interface is a wireless local area network (WLAN) radio frequency (RF) interface;
the second network interface is a cellular RF interface; and
the third network interface is a satellite RF interface.

* * * * *

UNITED STATES PATENT AND TRADEMARK OFFICE
CERTIFICATE OF CORRECTION

PATENT NO. : 7,664,036 B2  Page 1 of 1
APPLICATION NO. : 10/779838
DATED : February 16, 2010
INVENTOR(S) : Richard A. Bye It is certified that error appears in the above-identified patent and that said Letters Patent is hereby corrected as shown below:

Title Page, Item (74): replace "Robert A. McLauchian, III" with --Robert A. McLauchlan III--.

Signed and Sealed this

Twenty-ninth Day of June, 2010

David J. Kappos
*Director of the United States Patent and Trademark Office*